US 12,510,555 B2

(12) United States Patent
Drews et al.

(10) Patent No.: US 12,510,555 B2
(45) Date of Patent: Dec. 30, 2025

(54) SYSTEMS AND RELATED PUMP MANIFOLD ASSEMBLIES

(71) Applicant: ILLUMINA, INC., San Diego, CA (US)

(72) Inventors: Bradley Drews, San Diego, CA (US); Reto Schoch, Menlo Park, CA (US); Tarun Khurana, Fremont, CA (US); Minsoung Rhee, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 186 days.

(21) Appl. No.: 17/021,653

(22) Filed: Sep. 15, 2020

(65) Prior Publication Data

US 2021/0080479 A1 Mar. 18, 2021

Related U.S. Application Data

(60) Provisional application No. 62/902,372, filed on Sep. 18, 2019.

(51) Int. Cl.
*B01L 3/00* (2006.01)
*G01N 35/10* (2006.01)

(52) U.S. Cl.
CPC .... *G01N 35/1072* (2013.01); *B01L 3/502738* (2013.01); *B01L 3/567* (2013.01);
(Continued)

(58) Field of Classification Search
CPC ......... B01L 3/502769; B01L 3/502738; B01L 2300/0636; B01L 2400/0622;
(Continued)

(56) References Cited

U.S. PATENT DOCUMENTS 7,625,760 B2   12/2009   Kitaguchi et al.
9,146,248 B2    9/2015   Hagerott et al.
(Continued)

FOREIGN PATENT DOCUMENTS

CN   103725591 A   4/2014
CN   103501907 B   6/2015
(Continued)

*Primary Examiner* — Elizabeth A Robinson
*Assistant Examiner* — Tingchen Shi
(74) *Attorney, Agent, or Firm* — MARSHALL, GERSTEIN & BORUN LLP

(57) ABSTRACT

An apparatus includes a flow cell interface adapted to be coupled to a flow cell having a plurality of channels and a pump manifold assembly carrying pump valves and pumps and including pump-channel fluidic lines, pump fluidic lines, and a shared fluidic line. The pump valves and the pumps are operable to individually control fluid flow through each channel of the plurality of channels of the flow cell via the corresponding pump-channel fluidic lines. Each pump valve being coupled to a corresponding pump-channel fluidic line, a corresponding pump fluidic line, and the shared fluidic line and being movable between a first position fluidically coupling a corresponding channel, a corresponding pump-channel fluidic line, and a corresponding pump fluidic line and a second position fluidically coupling a corresponding pump fluidic line, the shared fluidic line, and a waste reservoir. Each pump coupled to a corresponding pump fluidic line.

13 Claims, 17 Drawing Sheets

(52) U.S. Cl.
CPC .... *G01N 35/1002* (2013.01); *B01L 2200/141* (2013.01); *B01L 2200/16* (2013.01); *B01L 2300/0864* (2013.01); *B01L 2400/06* (2013.01); *B01L 2400/082* (2013.01)

(58) Field of Classification Search
CPC ..... B01L 2400/0644; B01L 2400/0409; B01L 2300/0864; B01L 3/022; B01L 3/0224; B01L 3/567; B01L 2200/141; B01L 2200/16; B01L 2400/06; B01L 2400/082; G01N 15/0637; G01N 15/0656; G01N 27/4145; G01N 35/08; G01N 33/5308; G01N 27/3275; G01N 2015/0065; G01N 27/414; G01N 35/04; G01N 35/1072; G01N 35/1002; F16K 99/0028; G05D 16/2066

See application file for complete search history.

(56) References Cited

U.S. PATENT DOCUMENTS

| | | | |
|---|---|---|---|
| 9,193,996 | B2 | 11/2015 | Buermann et al. |
| 9,591,268 | B2 | 3/2017 | Stoops et al. |
| 9,649,631 | B2 | 5/2017 | Bienvenue et al. |
| 10,220,386 | B2 | 3/2019 | Williamson et al. |
| 2002/0045243 | A1 | 4/2002 | Laska et al. |
| 2002/0059958 | A1 | 5/2002 | Krog |
| 2003/0086823 | A1* | 5/2003 | Fernando ............... G01N 33/15 436/52 |
| 2003/0162304 | A1 | 8/2003 | Dority et al. |
| 2009/0129980 | A1 | 5/2009 | Lawson et al. |
| 2010/0233696 | A1 | 9/2010 | Joseph et al. |
| 2011/0072914 | A1* | 3/2011 | Lebl ..................... F04B 19/006 73/864.11 |
| 2011/0212453 | A1 | 9/2011 | Agarwal et al. |
| 2012/0190589 | A1 | 7/2012 | Anderson et al. |
| 2013/0260372 | A1* | 10/2013 | Buermann ........... C12Q 1/6874 435/6.1 |
| 2013/0260375 | A1 | 10/2013 | Cummings et al. |
| 2014/0370519 | A1 | 12/2014 | Vangbo et al. |
| 2015/0045234 | A1 | 2/2015 | Stone et al. |
| 2015/0064702 | A1 | 3/2015 | Handique et al. |
| 2015/0093815 | A1 | 4/2015 | Kiani et al. |
| 2015/0148549 | A1 | 5/2015 | Van Dam et al. |
| 2015/0224499 | A1 | 8/2015 | Wang et al. |
| 2017/0225160 | A1 | 8/2017 | Jackson et al. |
| 2018/0099276 | A1 | 4/2018 | Schmolke et al. |
| 2018/0112248 | A1 | 4/2018 | Lam et al. |
| 2018/0185842 | A1 | 7/2018 | Drews et al. |
| 2018/0188279 | A1* | 7/2018 | Whitacre ............. B01F 25/103 |
| 2018/0217170 | A1 | 8/2018 | Ang et al. |
| 2018/0280975 | A1* | 10/2018 | Kilcoin ............. B01L 3/502738 |
| 2018/0375316 | A1 | 12/2018 | Greco |
| 2019/0001319 | A1* | 1/2019 | Petrek ................... B01L 3/0224 |
| 2019/0107476 | A1 | 4/2019 | Shi et al. |

FOREIGN PATENT DOCUMENTS

| | | |
|---|---|---|
| CN | 108025904 A | 5/2018 |
| CN | 213266471 U | 5/2021 |
| EA | 028833 B1 | 1/2018 |
| JP | H06-043173 A | 2/1994 |
| JP | 2015-514218 A | 5/2015 |
| JP | 2016-532111 A | 10/2016 |
| RU | 177920 U1 | 3/2018 |
| TW | 201330373 A | 7/2013 |
| TW | 201842336 A | 12/2018 |
| TW | I714069 B | 12/2020 |
| WO | WO-00/72970 A1 | 12/2000 |
| WO | WO-2015/021228 A1 | 2/2015 |
| WO | WO-2018/128801 A1 | 7/2018 |
| WO | WO-2018/187207 A2 | 10/2018 |
| WO | WO-2018/213268 A1 | 11/2018 |

* cited by examiner

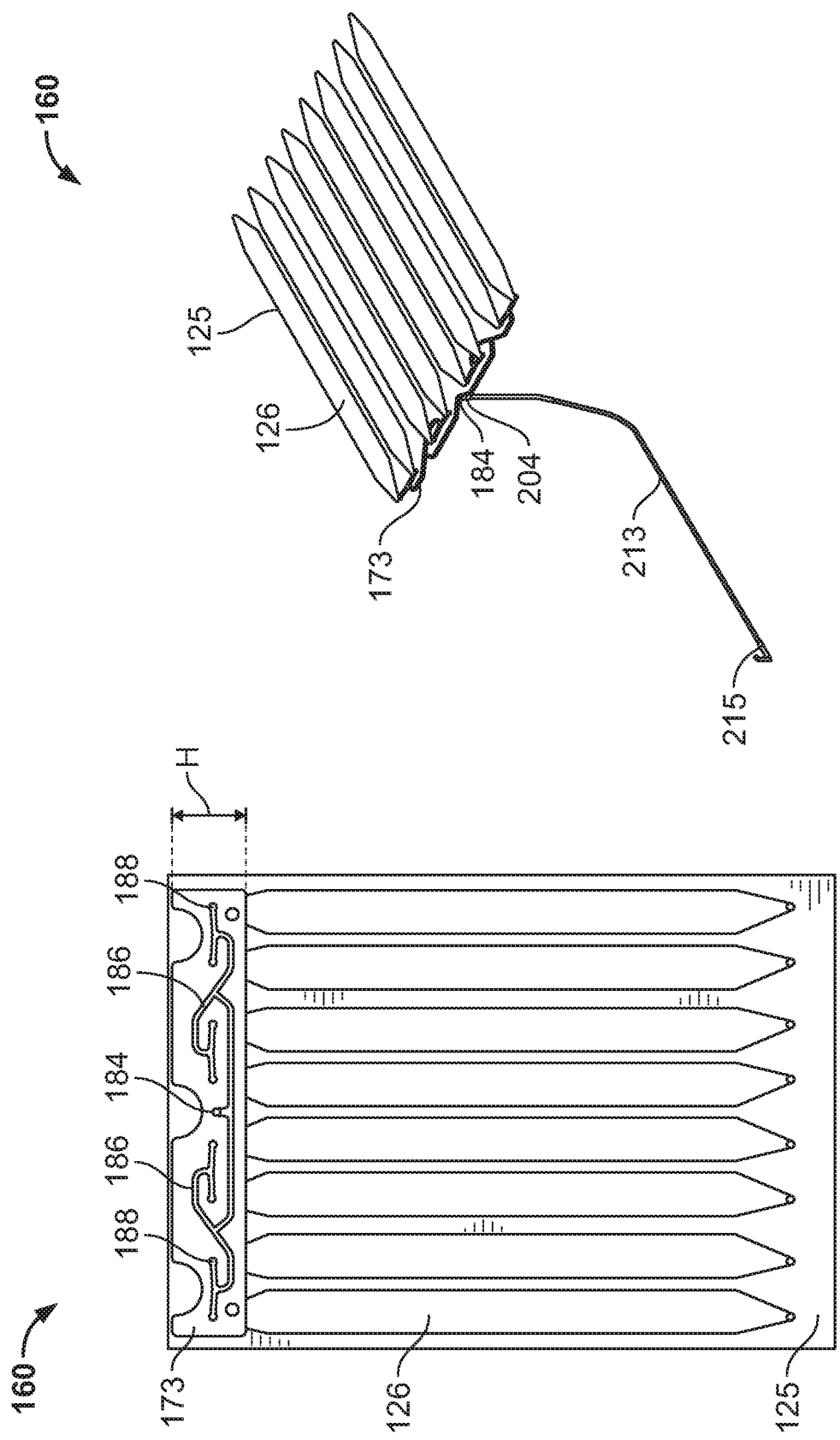

SYSTEMS AND RELATED PUMP MANIFOLD ASSEMBLIES

RELATED APPLICATION

This application claims the benefit of and priority to U.S. Provisional Patent Application No. 62/902,372, filed Sep. 18, 2019, the content of which is incorporated by reference herein in its entirety and for all purposes.

BACKGROUND

Sequencing platforms may include valves and pumps. The valves and pumps may be used to perform various fluidic operations.

SUMMARY

In accordance with a first implementation, a method comprises or includes coupling a flow cell comprising or having a plurality of channels to a flow cell interface. The flow cell interface is fluidically coupled to a pump manifold assembly. The method comprises or includes operating one or more of a plurality of pump valves and one or more of a plurality of pumps of the pump manifold assembly to individually control fluid flow through each channel of the plurality of channels via corresponding pump-channel fluidic lines. The pump manifold assembly comprises or includes the plurality of pump-channel fluidic lines, a plurality of pump fluidic lines, and a shared fluidic line. Each pump valve is coupled to a corresponding pump-channel fluidic line, a corresponding pump fluidic line, and the shared fluidic line. Each pump is coupled to a corresponding pump fluidic line.

In accordance with a second implementation, an apparatus comprises or includes a flow cell interface adapted to be coupled to a flow cell comprising or having a plurality of channels. The apparatus comprises or includes a pump manifold assembly carrying a plurality of pump valves and a plurality of pumps and comprises or includes a plurality of pump-channel fluidic lines, a plurality of pump fluidic lines, and a shared fluidic line. The pump valves and the pumps are operable to individually control fluid flow through each channel of the plurality of channels of the flow cell via the corresponding pump-channel fluidic lines. Each pump valve is coupled to a corresponding pump-channel fluidic line, a corresponding pump fluidic line, and the shared fluidic line. Each pump is coupled to a corresponding pump fluidic line.

In accordance with a third implementation, an apparatus comprises or includes one or more valves adapted to be coupled to corresponding reagent reservoirs. The apparatus comprises or includes a flow cell interface adapted to be coupled to a flow cell comprising or having a plurality of channels. The apparatus comprises or includes a pump manifold assembly comprising or having a plurality of pumps, a plurality of pump valves, and a cache. Each pump is operable to individually control fluid flow for each channel of the plurality of channels of the flow cell. The apparatus comprises or includes a bypass fluidic line operatively coupled between the one or more valves and the cache.

In accordance with a fourth implementation, a method comprises or includes coupling a flow cell comprising or having a plurality of channels to a flow cell interface. The method comprises or includes coupling a sample cartridge to a sample cartridge interface positioned downstream of the flow cell interface. The sample cartridge carries a sample of interest. The method comprises or includes operating one or more sample valves of a sample loading manifold assembly to individually load each channel of the plurality of channels of the flow cell with the sample of interest via a corresponding outlet of the flow cell and in a first direction. The method comprises or includes flowing reagent through the plurality of channels via a corresponding inlet of the flow cell and in a second direction opposite the first direction.

In accordance with a fifth implementation, an apparatus comprises or includes a flow cell interface adapted to be coupled to a flow cell comprising or having a plurality of channels. The apparatus comprises or includes a sample cartridge interface adapted to be coupled to a sample cartridge. The sample cartridge interface is positioned downstream of the flow cell interface. The apparatus comprises or includes a sample loading manifold assembly positioned between the flow cell interface and the sample cartridge interface and comprises or includes a body carrying a plurality of sample valves and defining a plurality of sample ports and a plurality of flow cell ports. Each sample port is coupled to a corresponding port of the sample cartridge interface via a sample fluidic line. Each flow cell port is coupled to a corresponding port of the flow cell interface and associated with one of the channels of the plurality of channels of the flow cell via a flow cell fluidic line.

In accordance with a sixth implementation, an apparatus comprises or includes one or more valves adapted to be coupled to corresponding reagent reservoirs. The system comprises or includes a flow cell interface adapted to be coupled to a flow cell comprising or having a plurality of channels. The apparatus comprises or includes a sample cartridge interface comprising or having a plurality of ports and adapted to be coupled to a sample cartridge carrying a sample of interest. The sample cartridge interface is positioned downstream of the flow cell interface. The apparatus comprises or includes a pump manifold assembly comprising or having a plurality of pumps and a plurality of pump valves. Each pump and a corresponding pump valve are operable to individually control the flow of the sample of interest between each port of the plurality ports of the sample cartridge interface and a corresponding channel of the plurality of channels of the flow cell.

In accordance with a seventh implementation, a method comprises or includes coupling a flow cell comprising or having a plurality of channels to a flow cell interface. The flow cell interface is fluidically coupled to a pump manifold assembly. The method comprises or includes moving a first pump valve of a plurality of pump valves of the pump manifold assembly to a first position to fluidically connect a first channel of the plurality of channels with a first pump of a plurality of pumps. The first pump is fluidically connected to the first channel via a first pump-channel fluidic line. The method comprises or includes pumping a first volume of a first reagent through the first channel using the first pump via the first pump-channel fluidic line and moving the first pump valve of the plurality of pump valves to a second position to fluidically connect the pump and the first pump-channel fluidic line with a shared fluidic line in fluid communication with a waste reservoir. The method comprises or includes pumping the first volume of the first reagent into the waste reservoir through the shared fluidic line and moving a second pump valve of a plurality of pump valves to a first position to fluidically connect a second channel of the plurality of channels with a second pump of the plurality of pumps. The second pump is fluidically connected to the second channel via a second pump-channel fluidic line. The method comprises or includes pumping a second volume of the first reagent into the second channel using the second pump via the second pump-channel fluidic line and moving the second pump valve of the plurality of pump valves to a second position to fluidically connect the second pump and the second pump-channel fluidic line with the shared fluidic line in fluid communication with the waste reservoir. The method comprises or includes pumping the second volume of the first reagent into the waste reservoir through the shared fluidic line.

In accordance with an eighth implementation, an apparatus comprises or includes a flow cell interface adapted to be coupled to a flow cell comprising or having a plurality of channels and a pump manifold assembly carrying a plurality of pump valves and a plurality of pumps and comprising or including a plurality of pump-channel fluidic lines, a plurality of pump fluidic lines, and a shared fluidic line. The pump valves and the pumps are operable to individually control fluid flow through each channel of the plurality of channels of the flow cell via the corresponding pump-channel fluidic lines. Each pump valve is coupled to a corresponding pump-channel fluidic line, a corresponding pump fluidic line, and the shared fluidic line and are movable between a first position fluidically coupling a corresponding channel of the plurality of channels, a corresponding pump-channel fluidic line, and a corresponding pump fluidic line and a second position fluidically coupling a corresponding pump fluidic line, the shared fluidic line, and a waste reservoir. Each pump is coupled to a corresponding pump fluidic line.

In accordance with an eighth implementation, an apparatus comprises or includes one or more valves adapted to be coupled to corresponding reagent reservoirs, a flow cell interface adapted to be coupled to a flow cell comprising or having a plurality of channels, and a pump manifold assembly comprising or having a plurality of pumps, a plurality of pump valves, and a cache. Each pump is operable to individually control fluid flow for each channel of the plurality of channels of the flow cell. The apparatus comprises or includes a bypass fluidic line operatively coupled between the one or more valves and the cache.

In accordance with a ninth implementation, a method comprises or includes coupling a flow cell comprising or having a first channel and a second channel to a flow cell interface and moving a first sample valve of one or more sample valves of a sample loading manifold assembly to a first position to fluidically couple a first sample reservoir of a sample cartridge to an outlet of the first channel of the flow cell. The method comprises or includes pumping a first sample of interest from the first sample reservoir into the first channel of the flow cell through the outlet of the first channel. An inlet of the first channel is fluidically connected to a waste reservoir via a central valve when the central valve is in a first position. The method comprises or includes moving the first sample valve of the one or more sample valves of the sample loading manifold assembly to a second position to fluidically disconnect the first sample reservoir of the sample cartridge and to fluidically connect the outlet of the first channel with the waste reservoir and moving the central valve to a second position to fluidically couple a reagent reservoir with the first channel and the second channel of the flow cell. The method comprises or includes pumping a first volume of reagent through the first channel and into the waste reservoir.

In accordance with a tenth implementation, an apparatus comprises or includes a flow cell interface adapted to be coupled to a flow cell comprising or having a plurality of channels and a central valve and an auxiliary waste fluidic line coupled to the central valve and adapted to be coupled to a waste reservoir. The central valve is coupled to the flow cell interface and movable between a first position fluidically connecting an inlet of the plurality of channels to the auxiliary waste fluidic line and a second position fluidically connecting a reagent reservoir and the plurality of channels. The apparatus comprises or includes a sample cartridge interface adapted to be coupled to a sample cartridge. The sample cartridge interface is positioned downstream of the flow cell interface and a sample loading manifold assembly positioned between the flow cell interface and the sample cartridge interface and comprises or includes a body carrying a plurality of sample valves and defining a plurality of sample ports and a plurality of flow cell ports. Each sample port is coupled to a corresponding port of the sample cartridge interface via a sample fluidic line. Each flow cell port is coupled to a corresponding port of the flow cell interface and associated with one of the plurality of channels of the flow cell via a flow cell fluidic line. Each of the sample valves are movable between a first position fluidically connecting a corresponding sample port and a corresponding outlet of the plurality of channels and a second position fluidically coupling the corresponding outlet of the plurality of channels and the waste reservoir.

In accordance with an eleventh implementation, an apparatus comprises or includes one or more valves adapted to be coupled to corresponding reagent reservoirs and a flow cell interface adapted to be coupled to a flow cell. The apparatus comprises or includes a sample cartridge interface comprising or having one or more ports and adapted to be coupled to a sample cartridge carrying a sample of interest. The sample cartridge interface is positioned downstream of the flow cell interface. The apparatus comprises or includes a pump adapted to load a channel of the flow cell with the sample of interest via the flow cell interface associated with an outlet of the flow cell and a corresponding port of the sample cartridge interface.

In further accordance with the foregoing first, second, third, fourth, fifth, sixth, seventh, eighth, ninth, tenth, and eleventh implementations, an apparatus and/or method may further comprise or include any one or more of the following:

In accordance with an implementation, further comprising or including moving a bypass valve to a first position to fluidically couple a bypass fluidic line and a cache of the pump manifold assembly, and pumping a third volume of the first reagent or another reagent through the bypass fluidic line and into the cache.

In accordance with another implementation, further comprising or including actuating one or more of the plurality of pump valves, one or more of the plurality of pumps, or a cache valve of the pump manifold assembly and pumping reagent between at least one of the shared fluidic line and a primary waste fluidic line in fluidic communication with the waste reservoir or the bypass fluidic line and the primary waste fluidic line.

In accordance with another implementation, further comprising or including operating one or more of the plurality of pump valves and one or more of the plurality of pumps of the pump manifold assembly to load one or more of the plurality of channels of the flow cell with a sample of interest.

In accordance with another implementation, operating the one or more of the plurality of pumps to load one or more of the channels of the plurality of channels of the flow cell with the sample of interest comprises or includes flowing the sample of interest in a first direction, and further comprising or including operating one or more of the plurality of pumps of the pump manifold assembly to control a flow of reagent through the channels of the flow cell in a second direction opposite the first direction.

In accordance with another implementation, further comprising or including operating one or more of the plurality of pumps of the pump manifold assembly to flow the sample of interest out of the one or more channels of the flow cell and into an auxiliary waste fluidic line. The auxiliary waste fluidic line is upstream of the flow cell interface.

In accordance with another implementation, the pump manifold assembly further comprises or includes a cache, and further comprising or including a bypass valve and a bypass fluidic line coupling the bypass valve and the cache.

In accordance with another implementation, the pump manifold assembly further comprises or includes a cache valve and a cache fluidic line. The cache valve is coupled to the cache fluidic line and the shared fluidic line.

In accordance with another implementation, the pump manifold assembly further comprises or includes a primary waste fluidic line coupled to the waste reservoir. The cache valve is coupled to the primary waste fluidic line.

In accordance with another implementation, the pump manifold assembly further comprises or includes a plurality of sensors adapted to determine one or more of a pressure value or a flow rate value of one or more of: at least one of the pump-channel fluidic lines or the shared fluidic line.

In accordance with another implementation, further comprising or including a pair of pump drive assemblies that are operable to drive the plurality of pumps.

In accordance with another implementation, further comprising or including a sample cartridge interface adapted to be coupled to a sample cartridge. The sample cartridge interface positioned downstream of the flow cell interface.

In accordance with another implementation, further comprising or including a sample loading manifold assembly positioned between the flow cell interface and the sample cartridge interface and comprising or including a body carrying a plurality of sample valves and defining a plurality of sample ports, a plurality of flow cell ports, and a plurality of pump ports. Each sample port is coupled to a corresponding port of the sample cartridge interface via a sample fluidic line. Each flow cell port is coupled to a corresponding port of the flow cell interface and associated with one of the channels of the plurality of channels of the flow cell via a flow cell fluidic line. Each pump port is coupled to a corresponding pump-channel fluidic line of the plurality of pump-channel fluidic lines.

In accordance with another implementation, the sample valves of the sample loading manifold assembly and pumps of the pump manifold assembly are operable to individually load each channel of the plurality of channels of the flow cell with a sample of interest.

In accordance with another implementation, each sample valve is operable to fluidly communicate a port of the sample cartridge and a corresponding pump of the plurality of pumps of the pump manifold assembly and to fluidly communicate a pump of the plurality of pumps of the pump manifold assembly and a corresponding channel of the plurality of channels of the flow cell.

In accordance with another implementation, further comprising or including a central valve and an auxiliary waste fluidic line coupled to the central valve and adapted to be coupled to the waste reservoir. The auxiliary waste fluidic line is positioned upstream of the flow cell interface.

In accordance with another implementation, further comprising or including a shared line valve, a bypass valve, a plurality of dedicated reagent fluidic lines, and a shared reagent fluidic line. The shared reagent fluidic line couple the shared line valve and the central valve and are adapted to flow one or more reagents to the flow cell via the central valve. Each dedicated reagent fluidic line couples the bypass valve and the central valve and is adapted to flow a reagent to the flow cell via the central valve.

In accordance with another implementation, further comprising or including a sample loading manifold assembly comprising or having a plurality of sample valves. Each sample valve and a corresponding pump of the pump manifold assembly is operable to individually load each channel of the plurality of channels of the flow cell. The sample loading manifold assembly is positioned downstream of the flow cell.

In accordance with another implementation, further comprising or including a flow cell assembly comprising or including the flow cell comprising or having the plurality of channels and a flow cell manifold. The flow cell manifold comprises or includes an inlet, a plurality of fluidic lines, and a plurality of outlets. Each outlet of the flow cell manifold is coupled to a corresponding channel of the flow cell.

In accordance with another implementation, pumping the first sample of interest from the first sample reservoir into the first channel of the flow cell comprises or includes moving the first sample of interest from the sample cartridge to a corresponding sample port of the sample loading manifold assembly, out of an associated pump port of the sample loading manifold assembly, and into a pump-channel fluidic line of a pump manifold assembly, and moving the first sample of interest from the pump-channel fluidic line, through the associated pump port, and through a corresponding flow cell port of the sample loading manifold assembly. Each flow cell port is coupled to a corresponding port of the flow cell interface and is associated with one of the channels of the plurality of channels of the flow cell.

In accordance with another implementation, moving the first sample valve of the one or more sample valves to the first position comprises or includes fluidically coupling a port of the sample cartridge interface and a corresponding pump and moving the first sample valve of the one or more sample valves to the second position comprises or includes fluidically coupling the corresponding pump and the first channel of the plurality of channels of the flow cell.

In accordance with another implementation, further comprising or including operating one or more of a plurality of pumps to individually control fluid flow for each channel of the plurality of channels of the flow cell.

In accordance with another implementation, further comprising or including flowing the first sample of interest out of the first channel of the flow cell and into an auxiliary waste fluidic line. The auxiliary waste fluidic line is upstream of the flow cell and is fluidically coupled to the central valve and the waste reservoir.

In accordance with another implementation, further comprising or including flowing a reagent through a shared reagent fluidic line to the plurality of channels of the flow cell and subsequently flowing another regent through a dedicated reagent fluidic line to the plurality of channels of the flow cell.

In accordance with another implementation, the sample valves are operable to individually load each channel of the plurality of channels of the flow cell.

In accordance with another implementation, further comprising or including a plurality of pumps. The body of the sample loading manifold assembly further defines a plurality of pump ports. Each pump port is coupled to one of the pumps of the plurality of pumps via a pump-channel fluidic line.

In accordance with another implementation, each sample valve is operable to fluidly communicate a port of the sample cartridge and a corresponding pump of the plurality of pumps and to fluidly communicate a pump of the plurality of pumps and a corresponding channel of the plurality of channels of the flow cell.

In accordance with another implementation, the pumps are operable to individually control fluid flow for each channel of the plurality of channels of the flow cell.

In accordance with another implementation, further comprising or including a pump manifold assembly comprising the pumps and a cache. Further comprising or including a bypass valve and a bypass fluidic line coupling the bypass valve and the cache.

In accordance with another implementation, further comprising or including a shared line valve, a plurality of dedicated reagent fluidic lines, and a shared reagent fluidic line. The shared reagent fluidic line couples the shared line valve and the central valve and is adapted to flow one or more reagents to the flow cell. Each dedicated reagent fluidic line couples the bypass fluidic line and the central valve and is adapted to flow toward the flow cell.

In accordance with another implementation, the pump manifold assembly carries a plurality of pump valves and a cache valve and comprises or includes a plurality of pump-channel fluidic lines, a plurality of pump fluidic lines, a shared fluidic line, a cache fluidic line, and a primary waste fluidic line. The cache fluidic line is coupled to and between the cache and the cache valve. Each pump valve is coupled to a corresponding pump-channel fluidic line, a corresponding pump fluidic line, and the shared fluidic line. The cache valve is coupled to the cache fluidic line, the primary waste fluidic line, and the shared fluidic line.

In accordance with another implementation, the pump valves and the pumps are operable to individually control fluid flow for each channel of the plurality of channels of the flow cell and the pump valves, the cache valve, and the pumps are operable to control fluid flow between the bypass fluidic line and the shared fluidic line.

In accordance with another implementation, the pump valves, the cache valve, and the pumps are operable to control fluid flow between the shared fluidic line and the primary waste fluidic line.

In accordance with another implementation, further comprising or including a pump manifold assembly comprising or having a plurality of pumps comprising or including the pump and a plurality of pump valves. Each pump and a corresponding pump valve are operable to individually control the flow of the sample of interest between each port of the one or more ports of the sample cartridge interface and a corresponding channel of the flow cell.

In accordance with another implementation, further comprising or including a sample loading manifold assembly comprising or having a plurality of sample valves. Each sample valve is operable to individually load each channel of the plurality of channels of the flow cell with the sample of interest.

In accordance with another implementation, further comprising or including a flow cell assembly comprising or including the flow cell comprising or having a plurality of channels and a flow cell manifold. The flow cell manifold comprises or includes an inlet, a plurality of fluidic lines, and a plurality of outlets. Each outlet of the flow cell manifold is coupled to a corresponding channel of the flow cell.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

BRIEF DESCRIPTION OF THE DRAWINGS

FIG. 6A illustrates a plan view of another implementation of a flow cell and another implementation of a flow cell manifold of a flow cell assembly that can be used with the system of FIG. 1A.

FIG. 6B illustrates an isometric view of the flow cell and the flow cell manifold of FIG. 6A and a fluidic line that can be used with the system of FIG. 1A.

FIG. 10 illustrates a schematic illustration of another implementation of a system in accordance with the teachings of this disclosure including one or more valves, a flow cell interface, and a pump manifold assembly.

DETAILED DESCRIPTION

Figure 1A:
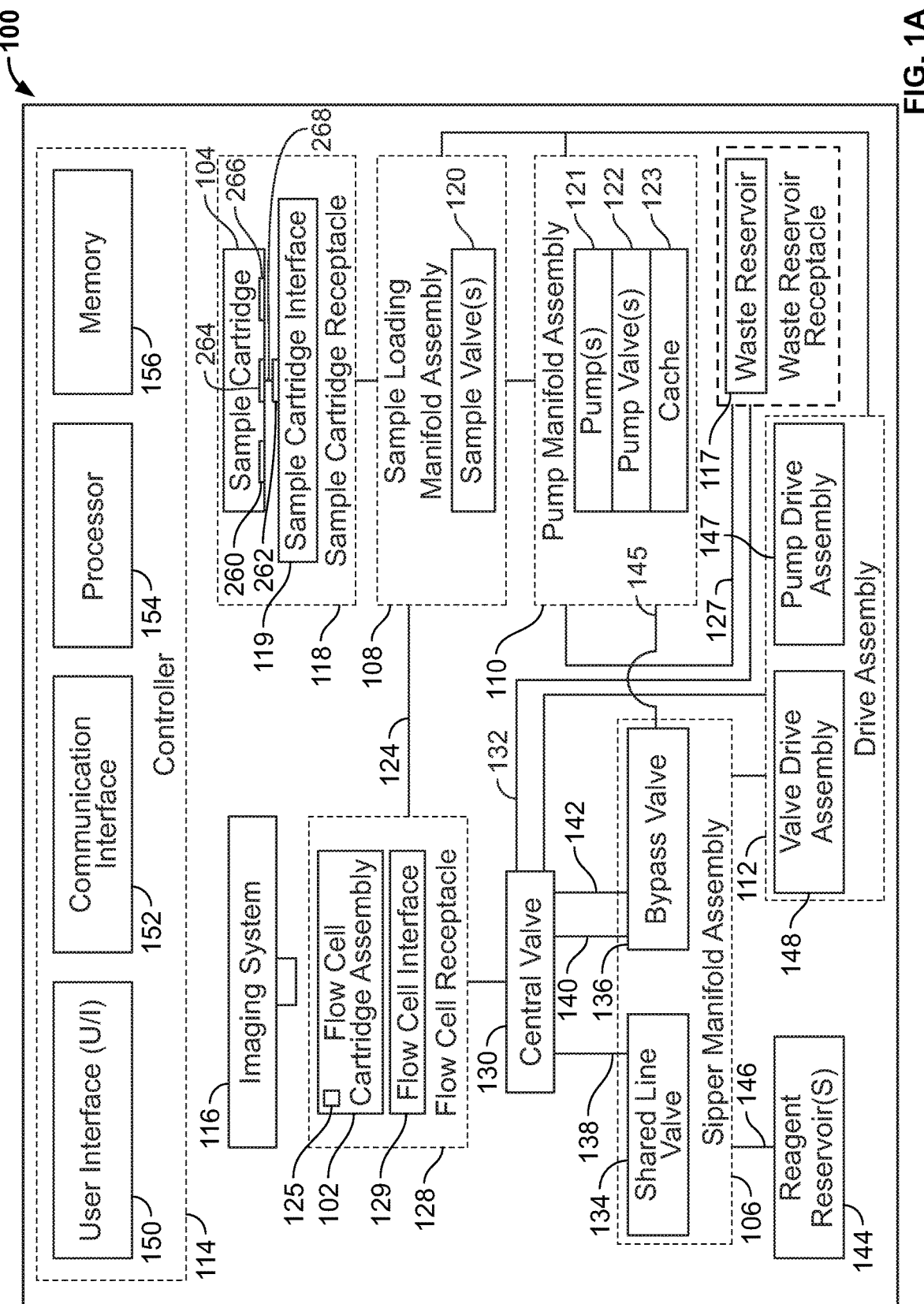
FIG. 1A illustrates a schematic diagram of an implementation of a system in accordance with the teachings of this disclosure.

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

The implementations disclosed herein relate to pump manifold assemblies and sample loading manifold assemblies for use with sequencing and/or array platforms or other systems. Using the disclosed implementations may reduce an amount of reagent used during at least some operations, may reduce an amount of run time to perform at least some operations, and may reduce the likelihood of contamination of analytes and/or contamination (e.g., cross-talk) between reagents.

The pump manifold assemblies may include a plurality of pumps, a plurality of pump valves, fluidic lines, and a cache. When the pump manifold assembly is coupled to a flow cell comprising or having a plurality of channels, the pumps and the pump valves may be operable to individually control the flow of fluid through each channel of the plurality of channels of the flow cell. The flow cell may include a single upstream opening in communication with each of the channels and may include a plurality of downstream openings in communication with each of the channels. The pump manifold assembly may be adapted to flow fluid from the upstream opening of the flow cell to the downstream openings of the flow cell. The pump manifold assembly may also be adapted to flow fluid from the downstream openings of the flow cell to the upstream opening of the flow cell. Thus, the pump manifold assembly may flow fluid through the flow cell in either direction.

The sample loading manifold assemblies may include a plurality of sample valves and a plurality of ports. The sample valves of the sample loading manifold assembly may be adapted to control fluid flow through the ports and between a sample cartridge carrying a sample of interest and the channels of the flow cell. In some implementations, some of the sample ports of the sample loading manifold assembly are coupled to corresponding ports of a sample cartridge interface, some of the sample ports of the sample loading manifold assembly are coupled to corresponding ports of a flow cell interface, and some of the sample ports of the sample loading manifold assembly are coupled to pumps of a pump manifold assembly. The sample cartridge may be coupled to the sample cartridge interface and the flow cell may be coupled to the flow cell interface.

The sample valves of the sample loading manifold assembly and the pumps of the pump manifold assembly may be operable to individually load each channel of the flow cell with the sample of interest. The sample loading assembly may be positioned downstream of the flow cell. Thus, the samples of interest may be loaded into the channels of the flow cell from the rear of the flow cell.

FIG. 1A illustrates a schematic diagram of an implementation of a system 100 in accordance with the teachings of this disclosure. The system 100 can be used to perform an analysis on one or more samples of interest. The sample may include one or more DNA clusters that have been linearized to form a single stranded DNA (sstDNA). In the implementation shown, the system 100 is adapted to receive a flow cell cartridge assembly 102 and a sample cartridge 104 and includes, in part, a sipper manifold assembly 106, a sample loading manifold assembly 108, and a pump manifold assembly 110. The system 100 also includes a drive assembly 112, a controller 114, an imaging system 116, and a waste reservoir 117. The controller 114 is electrically and/or communicatively coupled to the drive assembly 112 and to the imaging system 116 and is adapted to cause the drive assembly 112 and/or the imaging system 116 to perform various functions as disclosed herein.

The sample cartridge 104 carries one or more samples of interest (e.g., an analyte) in samples wells 260 and may be receivable in a sample cartridge receptacle 118. The sample cartridge 104 may be couplable with a sample cartridge interface 119 including a sipper assembly 262 that is used to draw samples from the sample wells 260. The sample wells 260 may be referred to as sample reservoirs. The sample cartridge 104 also includes prime wells 264 and one or more wash wells 266 that may contain a wash buffer and/or a cleaning solution such as bleach.

In the implementation shown, the sample loading manifold assembly 108 includes one or more sample valves 120 and the pump manifold assembly 110 includes one or more pumps 121, one or more pump valves 122, and a cache 123. One or more of the valves 120, 122 may be implemented by a rotary valve, a pinch valve, a flat valve, a solenoid valve, a check valve, a piezo valve, and/or a three-way valve. Other types of fluid control devices may prove suitable. One or more of the pumps 121 may be implemented by a syringe pump, a peristaltic pump, and/or a diaphragm pump. Other types of fluid transfer devices may prove suitable. The cache 123 may be a serpentine cache and may be adapted to receive a volume of about 4 milliliters (mL). The cache 123 may be adapted to temporarily store one or more reaction components during, for example, bypass manipulations of the system 100 of FIG. 1A. While the cache 123 is shown being included in the pump manifold assembly 110, in another implementation, the cache 123 may be located in a different location. For example, the cache 123 may be included in the sipper manifold assembly 106 or in another manifold downstream of the bypass fluidic line 145.

In operation, the sipper assembly 162 draws one or more samples from the sample wells 260 and the sample loading manifold assembly 108 and the pump manifold assembly 110 flow the one or more samples of interest from the sample cartridge 104 through a fluidic line 124 toward the flow cell cartridge assembly 102. The flow cell cartridge assembly 102 may include a flow cell 125 having a plurality of channels 126 (an implementation of the flow cell 125 and the channels 126 are more clearly shown in FIG. 2). In an implementation, the sample loading manifold assembly 108 may be adapted to individually load/address each channel 126 of the flow cell 125 with a sample of interest. The process of loading the channels 126 with a sample of interest may occur automatically using the system 100 of FIG. 1A.

In the implementation shown, the sample cartridge 104 and the sample loading manifold assembly 108 are positioned downstream of the flow cell cartridge assembly 102. Thus, the sample loading manifold assembly 108 may load a sample of interest into the flow cell 125 from the rear of the flow cell 125. Loading a sample of interest from the rear of the flow cell 125 may be referred to as "back loading." Back loading the sample of interest into the flow cell 125 may reduce contamination. In the implementation shown, the sample loading manifold assembly 108 is coupled between the flow cell cartridge assembly 102 and the pump manifold assembly 110.

To prime the system 100 with, for example, hybridization buffer and/or to remove air from the system 100, the pumps 121 draw the hybridization buffer through the flow cell 125 and the sipper assembly 262 dispenses the hybridization buffer into the prime wells 264 once the system 100 is primed. Thereafter, the sample of interest is drawn from the sample cartridge 104 using sippers 268 of the sipper assembly 162 and the sample valves 120, the pump valves 122, and/or the pumps 121 selectively actuate to urge the sample of interest toward the pump manifold assembly 110. The sample cartridge 104 may include the sample wells 260 that are selectively fluidically accessible via the corresponding sippers 268. Thus, each sample can be selectively isolated from other samples using the corresponding sippers 268 and the corresponding sample valves 120.

To draw the sample of interest from one of the sample wells 260, a sample valve 120 for the corresponding sample of interest can be opened or released to fluidically connect the sample well 260 to an instrument fluidics system. A corresponding pump 121 can be actuated to draw the sample of interest from the sample well 260 and into a fluidic line, such as a fluidic line of the pump manifold assembly 110 and/or another fluidic line. In some implementations, a corresponding pump valve 122 can be opened, closed, and/or moved from a first position to a second position to fluidically couple the corresponding pump 121 to the corresponding fluidic line for the corresponding sample well 260. Thus, the pump valve 122 can be selectively isolated from other pumps 121 and/or pump valves 122 using the corresponding pump valve 122. In some implementations, a sample of interest can be temporarily stored in a line volume between a pump valve 122 and/or a sample valve 120 and a corresponding pump 121.

To individually flow the sample of interest toward a corresponding channel 126 or channels 126 of the flow cell 125 and away from the pump manifold assembly 110, the sample valves 120, the pump valves 122, and/or the pumps 121 may be selectively actuated to urge the sample of interest toward the flow cell cartridge assembly 102 and into the respective channels 126 of the flow cell 125. For instance, after the sample of interest is aspirated into a line volume, the sample valve 120 can be closed, thereby fluidically disconnecting the sample wells 260 from the line volume. In some instances, the sample valve 120 may be moved from a first position to a second position to fluidically couple the corresponding pump 121 to the corresponding channel 126 or channels 126 via the sample loading manifold assembly 108. The pump 121 can then push the sample of interest into the corresponding channel 126 or channels 126. In some implementations, a corresponding pump valve 122 may be opened, closed, and/or moved from a second position to a first position to fluidically couple the corresponding pump 121 to the corresponding channel 126 or channels 126. In some implementations, each channel 126 of the plurality of channels 126 receives the sample of interest. In other implementations, one or more of the channels 126 may selectively receive the sample of interest and others of the channels 126 may not receive the sample of interest. The channels 126 of the flow cell 125 that may not be receive the sample of interest may receive a wash buffer instead, for example.

The drive assembly 112 interfaces with the sipper manifold assembly 106 and the pump manifold assembly 110 to flow one or more reagents that interact with the sample at the flow cell 125 through the flow cell cartridge assembly 102. In an implementation, a reversible terminator with an identifiable label is attached to the detection nucleotide to allow a single nucleotide to be incorporated by the sstDNA per cycle. In some such implementations, one or more of the nucleotides has a unique fluorescent label that emits a color when excited. The color (or absence thereof) is used to detect the corresponding nucleotide. In the implementation shown, the imaging system 116 is adapted to excite one or more of the identifiable labels (e.g., a fluorescent label) and thereafter obtain image data for the identifiable labels. The labels may be excited by incident light and/or a laser and the image data may include one or more colors emitted by the respective labels in response to the excitation. The image data (e.g., detection data) may be analyzed by the system 100. The imaging system 116 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 112 interfaces with the sipper manifold assembly 106 and the pump manifold assembly 110 to flow another reaction component (e.g., a reagent) through the flow cell 125 that is thereafter received by the waste reservoir 117 via a primary waste fluidic line 127 and/or otherwise exhausted by the system 100. Some reaction components perform a flushing operation that chemically cleaves the fluorescent label and the reversible terminator from the sstDNA. The sstDNA is then ready for another cycle. In some implementations, between runs of the system 100, the sippers 268 are cleaned by dipping the sippers 268 in the wash wells 266 containing a cleaning solution such as bleach or a wash buffer. The cleaning solution is removable by dipping the sippers 268 in the prime wells 264 containing the hybridization buffer. However, other approaches of cleaning the sippers 268 may be suitable.

The primary waste fluidic line 127 is adapted to be coupled between the pump manifold assembly 110 and the waste reservoir 117. In some implementations, the pumps 121 and/or the pump valves 122 of the pump manifold assembly 110 are adapted to selectively flow the reaction components from the flow cell cartridge assembly 102, through the fluidic line 124 and the sample loading manifold assembly 108 to the primary waste fluidic line 127.

In the implementation shown, the flow cell cartridge assembly 102 is receivable in a flow cell receptacle 128 and is couplable with a flow cell interface 129. In another implementation, the flow cell receptacle 128 may be excluded and the flow cell cartridge assembly 102 may be directly coupled to the flow cell interface 129.

The flow cell cartridge assembly 102 is coupled to a central valve 130 via the flow cell interface 129. An auxiliary waste fluidic line 132 is coupled to the central valve 130 and to the waste reservoir 117. In some implementations, the auxiliary waste fluidic line 132 is adapted to receive any excess fluid of a sample of interest from the flow cell cartridge assembly 102, via the central valve 130, and to flow the excess fluid of the sample of interest to the waste reservoir 117 when back loading the sample of interest into the flow cell 125, as described herein. That is, the sample of interest may be loaded from the rear of the flow cell 125 and any excess fluid for the sample of interest may exit from the front of the flow cell 125. As will be described herein, by back loading samples of interest into the flow cell 125, different samples can be separately loaded to corresponding channels 126 and a single manifold (see, for example, the flow cell manifold 173 of FIG. 2) can couple the front of the flow cell 125 to the central valve 130 to direct excess fluid of each sample of interest to the auxiliary waste fluidic line 132 to reduce the likelihood of contamination of one sample for a first channel 126 with a second channel 126. Once the samples of interest are loaded into the flow cell 125, the single manifold can then be used for delivering common reagents from the front of the flow cell 125 (e.g., upstream) for each channel 126 and may exit the flow cell 125 from the rear of the flow cell 125 (e.g., downstream). Put another way, the sample of interest and the reagents may flow in opposite directions through the channels 126 of the flow cell 125.

Referring to the sipper manifold assembly 106, in the implementation shown, the sipper manifold assembly 106 includes a shared line valve 134 and a bypass valve 136. The shared line valve 134 may be referred to as a reagent selector valve. The central valve 130 and the valves 134, 136 of the sipper manifold assembly 106 may be selectively actuated to control the flow of fluid through fluidic lines 138, 140, 142. One or more of the valves 130, 134, 136 may be implemented by a rotary valve, a pinch valve, a flat valve, a solenoid valve, a check valve, a piezo valve, etc. Other fluid control devices may prove suitable.

The sipper manifold assembly 106 may be coupled to a corresponding number of reagents reservoirs 144 via reagent sippers 146. The reagent reservoirs 144 may contain fluid (e.g., reagent and/or another reaction component). In some implementations, the sipper manifold assembly 106 includes a plurality of ports. Each port of the sipper manifold assembly 106 may receive one of the reagent sippers 146. The reagent sippers 146 may be referred to as fluidic lines.

The shared line valve 134 of the sipper manifold assembly 106 is coupled to the central valve 130 via the shared reagent fluidic line 138. Different reagents may flow through the shared reagent fluidic line 138 at different times. In an implementation, when performing a flushing operation before changing between one reagent and another, the pump manifold assembly 110 may draw wash buffer through the shared reagent fluidic line 138, the central valve 130, and the flow cell cartridge assembly 102. Thus, the shared reagent fluidic line 138 may be involved in the flushing operation. While one shared reagent fluidic line 138 is shown, any number of shared fluidic lines may be included in the system 100.

The bypass valve 136 of the sipper manifold assembly 106 is coupled to the central valve 130 via the dedicated reagent fluidic lines 140, 142. The central valve 130 may have one or more dedicated ports that correspond to the dedicated reagent fluidic lines 140, 142. Each of the dedicated reagent fluidic lines 140, 142 may be associated with a single reagent. The fluids that may flow through the dedicated reagent fluidic lines 140, 142 may be used during sequencing operations and may include a cleave reagent, an incorporation reagent, a scan reagent, a cleave wash, and/or a wash buffer. Thus, when performing a flushing operation before changing between one reagent and another in association with the bypass valve 136, the sipper manifold assembly 106 may draw wash buffer through the central valve 130 and/or the flow cell cartridge assembly 102. However, because only a single reagent may flow through each of the dedicated reagent fluidic lines 140, 142, the dedicated reagent fluidic lines 140, 142 themselves may not be flushed. The approach of including dedicated reagent fluidic lines 140, 142 may be advantageous when the system 100 uses reagents that may have adverse reactions with other reagents. Moreover, reducing a number of fluidic lines or length of the fluidic lines that are flushed when changing between different reagents reduces reagent consumption and flush volume and may decrease cycle times of the system 100. While two dedicated reagent fluidic lines 140, 142 are shown, any number of dedicated fluidic lines may be included in the system 100.

The bypass valve 136 is also coupled to the cache 123 of the pump manifold assembly 110 via a bypass fluidic line 145. One or more reagent priming operations, hydration operations, mixing operations, and/or transfer operations may be performed using the bypass fluidic line 145. The priming operations, the hydration operations, the mixing operations, and/or the transfer operations may be performed independent of the flow cell cartridge assembly 102. Thus, the operations using the bypass fluidic line 145 may occur during, for example, incubation of one or more samples of interest within the flow cell cartridge assembly 102. That is, the shared line valve 134 can be utilized independently of the bypass valve 136 such that the bypass valve 136 can utilize the bypass fluidic line 145 and/or the cache 123 to perform one or more operations while the shared line valve 134 and/or the central valve 130 simultaneously, substantially simultaneously, or offset synchronously perform other operations. Thus, performing multiple operations using the system 100 at once may reduce run time. Moreover, the bypass valve 136 and the bypass fluidic line 145 can be used to flow hybridization buffer through the pump manifold assembly 110 to the sample manifold assembly 108 to allow the hybridization buffer to follow the sample of interest through the flow cell 128. Thus, the order of fluid flowing through the flow cell 125 may be: 1) hybridization buffer from the priming operation; 2) the sample drawn from the sample wells 260 via the sippers 268; and 3) the hybridization buffer accessed via the bypass valve 136 and the bypass fluidic valve 145.

Referring now to the drive assembly 112, in the implementation shown, the drive assembly 112 includes a pump drive assembly 147 and a valve drive assembly 148. The pump drive assembly 147 may be adapted to interface with the one or more pumps 121 to pump fluid through the flow cell 125 and/or to load one or more samples of interest into the flow cell cartridge assembly 102. The valve drive assembly 147 may be adapted to interface with one or more of the valves 120, 122, 130, 134, 136 to control the position of the corresponding valves 120, 122, 130, 134, 136. In an implementation, the shared line valve 134 and/or the bypass valve 136 are implemented by rotary valves having a first position that blocks flow to the flow cell 125 and a second position that allows flow from the reagent reservoir 144 to the flow cell 125. However, either of the valves 134, 136 may be positioned in any number of positions to flow any one or more of a first reagent, a buffer reagent, a second reagent, etc. to the flow cell cartridge assembly 102. As an example, the bypass valve 136 may be rotated between a first position allowing fluid flow from one or more of the reagent reservoirs 144, through the bypass valve 136, and to the central valve 130 and a second position allowing fluid flow from one or more of the reagent reservoirs 144, through the bypass valve 136, and into the bypass fluidic line 145. Other arrangements may prove suitable. For example, the bypass valve 136 may be positionable to allow fluid flow from the bypass fluidic line 145, through the bypass valve 136, and to a mixing reservoir of the reagent reservoirs 144.

Referring to the controller 114, in the implementation shown, the controller 114 includes a user interface 150, a communication interface 152, one or more processors 154, and a memory 156 storing instructions executable by the one or more processors 154 to perform various functions including the disclosed implementations. The user interface 150, the communication interface 133, and the memory 156 are electrically and/or communicatively coupled to the one or more processors 154.

In an implementation, the user interface 150 is adapted to receive input from a user and to provide information to the user associated with the operation of the system 100 and/or an analysis taking place. The user interface 150 may include a touch screen, a display, a key board, a speaker(s), a mouse, a track ball, and/or a voice recognition system. The touch screen and/or the display may display a graphical user interface (GUI).

In an implementation, the communication interface 152 is adapted to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records and/or a protocol(s) to be executed by the system 100.

The one or more processors 154 and/or the system 100 may include one or more of a processor-based system(s) or a microprocessor-based system(s). In some implementations, the one or more processors 154 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit and/or another logic-based device executing various functions including the ones described herein.

The memory 156 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

Figure 1B:
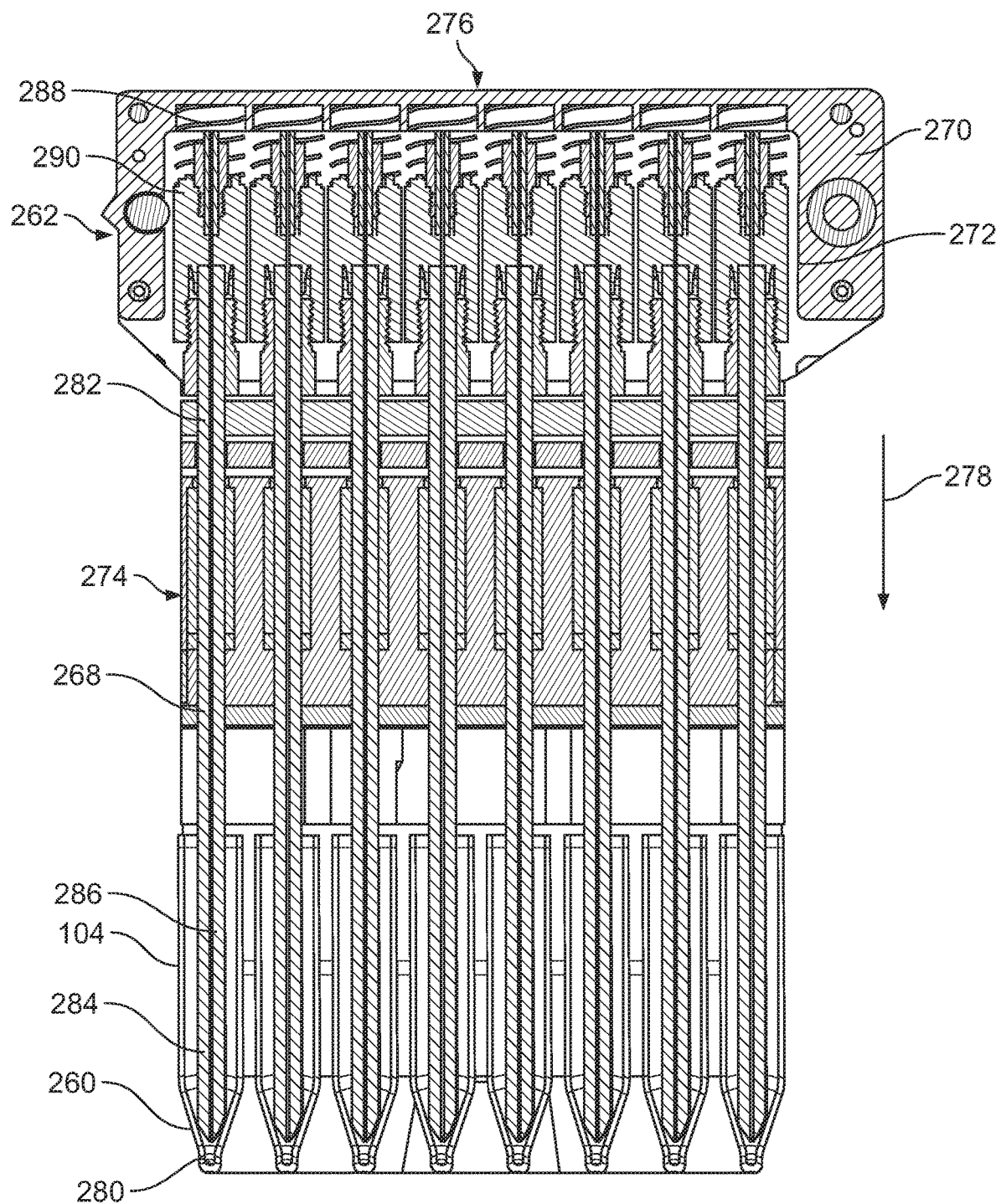
FIG. 1B is a cross-sectional view of an implementation of the sipper assembly including the sippers and the sample cartridge including the sample wells that can be used with the system of FIG. 1.

FIG. 1B is a cross-sectional view of an implementation of the sipper assembly 262 including the sippers 268 and the sample cartridge 104 including the sample wells 260 that can be used with the system 100 of FIG. 1. In the implementation shown, the sipper assembly 262 is an automated pipettor that includes a base 270 having a cavity 272, a sipper array 274 including the sippers 268 and at least partially disposed within the cavity 272, and a spring assembly 276 urging the sippers 268 in a direction generally indicated by arrow 278 and into the sample wells 260. Having the spring assembly 276 urge the sippers 268 into the sample wells 260 allows the sippers 268 to be positioned adjacent a lower surface 280 of the sample wells 260, thereby reducing dead volume within the sample well 260 and allowing less of the sample to be provided during a fluidics analysis operation.

Referring to the sippers 268, in the implementation shown, each of the sippers 268 has a proximal portion 282 disposed within the cavity 272, a distal portion 284 disposed within the sample wells 260, and a fluidic path 286 extending between the portions 282, 284. The spring assembly 276 includes springs 288 that surround the corresponding sippers 268 at the proximal portion 282 and are seated on a corresponding spring seat 290 of the sipper assembly 262.

Figure 1C:
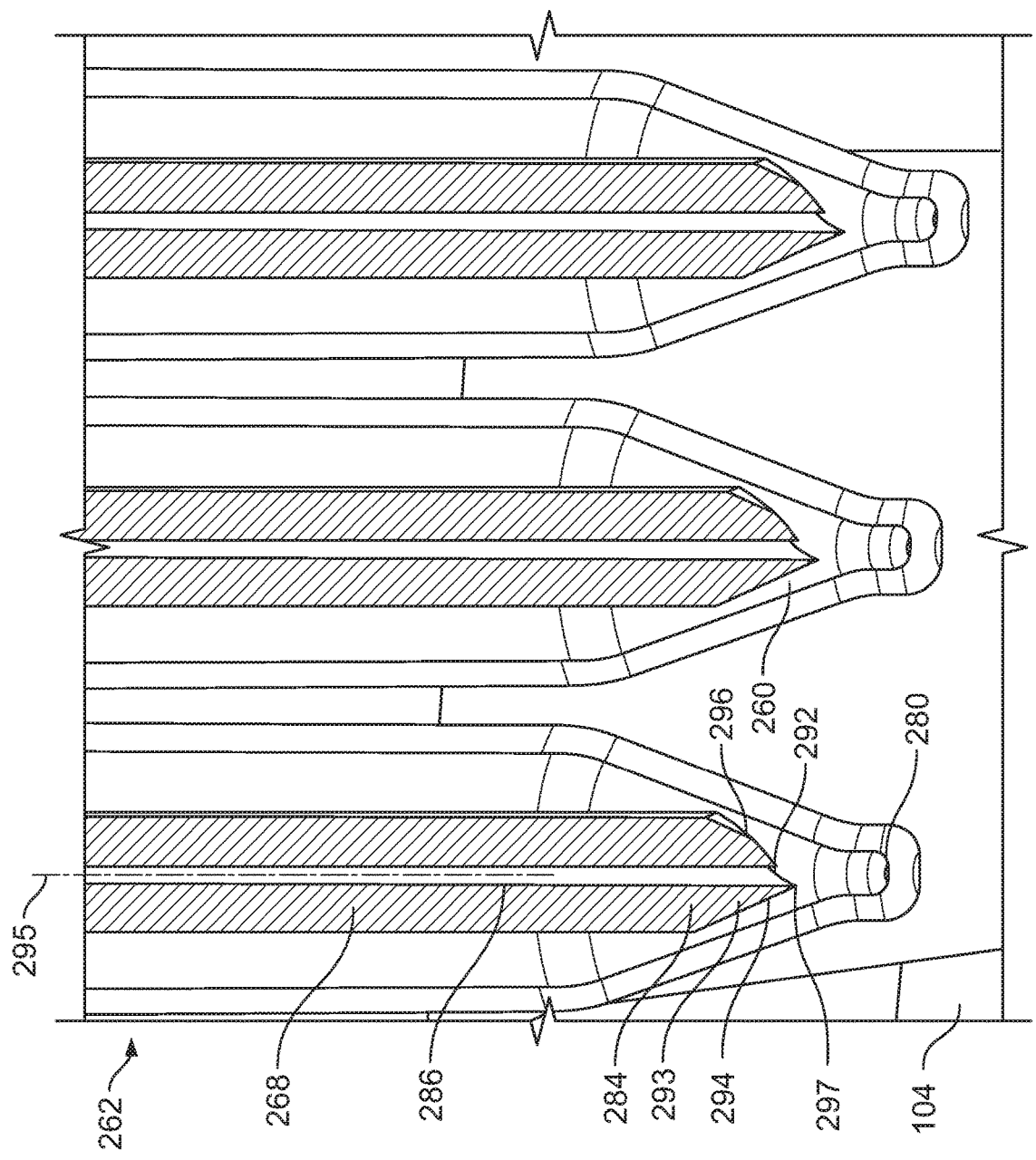

Referring to FIG. 1C, a detailed cross-sectional view of the distal portion 284 of the sipper assembly 262 and the sample wells 260 of the sample cartridge 104 of FIG. 1B are shown. In the implementation shown, the sippers 268 each has an opening 292 at the distal portion 284 and a tip 293. The tip 293 is formed by a first surface 294 positioned at a first angle relative to a longitudinal axis 295 of the sipper 268 and a second surface 296 positioned at a second angle relative to the longitudinal axis 295. As shown, the first angle is about 30° and the second angle is about 50°. However, the surfaces 294, 296 may be disposed at different angles including the same angle.

The difference between the first and second angles off-sets a tip end 297 of the tip 293 from the longitudinal axis 295 and allows the opening 292 to be spaced from the tip end 297. Because the tip end 297 extends past the opening 292 and engages the lower surface 280, the opening 292 is less likely engage to the lower surface 298 of the sample well 260 and become occluded and/or obstructed. To further reduce an amount of dead volume present within the sample wells 260, the lower surface 280 of the sample wells 260 is tapered.

Figure 2:
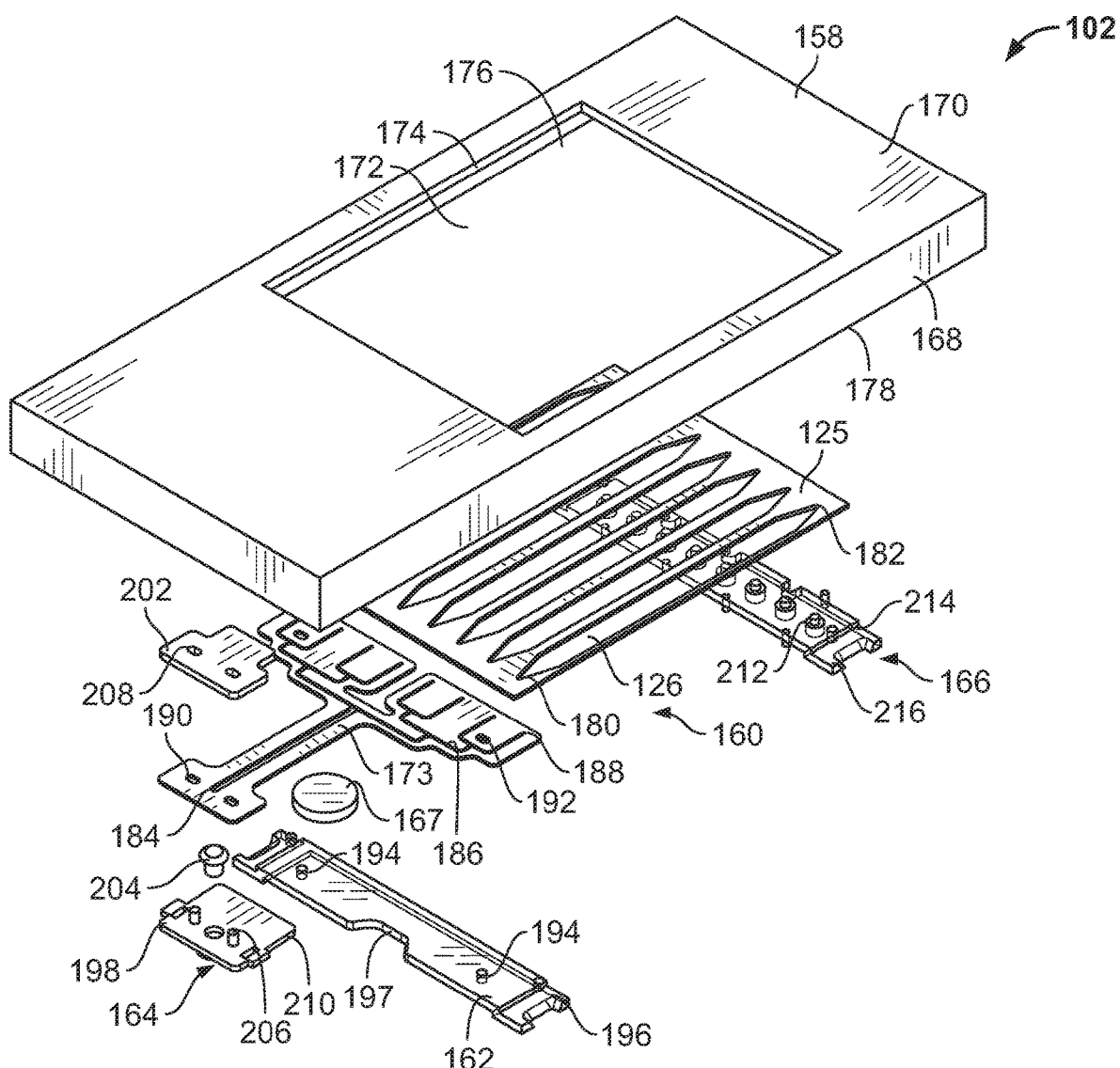
FIG. 2 illustrates an isometric expanded view of an implementation of a flow cell cartridge assembly that is receivable in a flow cell receptacle of the system of FIG. 1A.

FIG. 2 illustrates an isometric expanded view of an implementation of the flow cell cartridge assembly 102 that is receivable in the flow cell receptacle 128 of the system 100 of FIG. 1A. In the implementation shown, the flow cell cartridge assembly 102 includes a body 158, a flow cell assembly 160, a flow cell coupling 162, an inlet gasket assembly 164, and an outlet gasket assembly 166. The flow cell coupling 162 may be referred to as a bracket. The inlet gasket assembly 164 and/or the outlet gasket assembly 166 may interface or otherwise fluidically couple with the flow cell interface 129 of the system 100 of FIG. 1A. The inlet gasket assembly 164 may be directly coupled to the central valve 130 or may be coupled to the central valve 130 via one or more fluidic lines (see, for example, FIG. 6B).

In the implementation shown, the flow cell cartridge assembly 102 may also carry a radio frequency identification (RFID) tag 167. The RFID tag 167 may be used for tracking and/or identification purposes. Other methods of tracking and/or identifying the flow cell cartridge assembly 102 may prove suitable.

The body 158 of the flow cell cartridge assembly 102 has perimeter walls 168 and a top surface 170. The perimeter walls 168 and the top surface 170 define a cavity 172. The cavity 172 includes an upper opening 174 and a lower opening 176. The upper opening 174 is defined by the top surface 170. The upper opening 174 may allow image data to be obtained of the flow cell 125 via the imaging system 116. The lower opening 176 is defined by a lower edge 178 of the perimeter walls 168. The lower opening 176 may allow for the sample of interest to be loaded into the channels 126 of the flow cell 125 via the outlet gasket assembly 166 and/or for one or more reagents to flow into the channels 126 of the flow cell 125 via the inlet gasket assembly 164.

The flow cell assembly 160 includes the flow cell 125 having the plurality of channels 126 and a flow cell manifold 173. Each channel 126 of the plurality of channels 126 has as a corresponding channel inlet 180 and a corresponding channel outlet 182. The channel inlet 180 may be referred to as an inlet of the flow cell 125. The channel outlet 182 may be referred to as outlet of the flow cell 125. However, depending on the direction of the fluid flow, the channel inlets 180 may act as outlets to the flow cell 125 and the channel outlets 182 may act as inlets to the flow cell 125. For example, when the sample of interest is loaded into the channels 126 from the rear of the flow cell 125, the channel outlets 182 may act as inlets to the flow cell 125.

The flow cell manifold 173 is adapted to be coupled to the flow cell 125 and may be formed by a laminate. The flow cell manifold 173 may provide a mechanically flexible connection with the flow cell 125. The flow cell manifold 173 may be coupled to the flow cell 125 using adhesive. Other methods of coupling the flow cell 125 and the flow cell manifold 173 may prove suitable.

In the implementation shown, the flow cell manifold 173 includes a single inlet 184, a plurality of fluidic lines 186 (the fluidic lines 186 are more clearly shown in FIG. 3), and a plurality of outlets 188. The inlet 184 may be referred to as a flow cell manifold inlet. The inlet 184 of the flow cell manifold 173 is coupled to each of the outlets 188, via the fluidic lines 186. The fluidic lines 186 may allow the flow cell assembly 160 to not use additional valving to control fluid flow.

The fluidic lines 186 may be adapted for flow splitting and may be referred to as flow splitters. In an implementation, fluid flowing through the inlet 184 may be substantially equally split between the channels 126 of the flow cell 125. In some implementations, the flow cell manifold 173 and/or the fluidic lines 186 may be adapted to reduce flow resistance and/or operating pressure of the system 100 of FIG. 1A. The fluidic lines 186 may have a height of approximately 300 micrometers (μm). Other heights for the fluidic lines 186 may prove suitable. In another implementation, the flow cell manifold 173 may be excluded and the body 158 of the flow cell cartridge assembly 102 may include the fluidic lines 186, the inlet 184, and the plurality of outlets 188. As an example, the fluidic lines 186, the inlet 184, and the plurality of outlets 188 may be molded and/or embossed into the body 158 of the flow cell cartridge assembly 102 (see, for example, FIGS. 13A and 13B).

The flow cell manifold 173 may also include inlet alignment holes 190 and outlet alignment holes 192. The inlet alignment holes 190 may be positioned on either side of the inlet 184 and the outlet alignment holes 192 may be positioned adjacent the outlets 188 of the flow cell manifold 173. The inlet alignment holes 190 and/or the outlet alignment holes 192 may be referred to as an interface of the flow cell manifold 173.

The flow cell coupling 162 includes protrusions 194. The protrusions 194 are receivable by the outlet alignment holes 192 of the flow cell manifold 173 to secure the flow cell manifold 173 relative to the flow cell 125. The flow cell coupling 162 may include end portions 196 that are adapted to form a snap fit connection with the body 158 of the flow cell cartridge assembly 102 or may float within predetermined tolerances relative to the body 158. The coupling between the flow cell coupling 162 and the body 158 of the flow cell assembly 102 may assist in retaining the flow cell 125 and the flow cell manifold 173 within the cavity 172 of the body 158 of the flow cell cartridge assembly 102.

In the implementation shown, the flow cell coupling 162 includes a cradle 197. The cradle 197 is a semi-circular cutout and may include tapered surfaces. The cradle 197 may be adapted to receive and/or secure the RFID tag 167 relative to the flow cell cartridge assembly 102. In some implementations, the cradle 197 may be omitted.

The inlet gasket assembly 164 includes a first portion 198, a second portion 202, and an inlet gasket 204. The inlet gasket 204 may be adapted to be coupled adjacent the inlet 184 of the flow cell manifold 173 and to allow fluid communication between the channels 126 of the flow cell 125 and the components of the system 100 of FIG. 1A. The first portion 198 of the inlet gasket assembly 164 includes protrusions 206 and the second portion 202 of the inlet gasket assembly 164 includes receptacles 208. The protrusions 206 are adapted to be received by the inlet alignment holes 190 of the flow cell manifold 173 and the receptacles 208 of the second portion 202 of the inlet gasket assembly 164. An interaction between the protrusions 206 and the receptacles 208 may couple the first and second portions 198, 202 of the inlet gasket assembly 164 together via, for example, a snap fit connection. In another implementation, the protrusions 206 may be received within the receptacles 208 for alignment purposes. Sides 210 of the first portion 198 of the inlet gasket assembly 164 may be adapted to form a snap fit connection with the second portion 202 of the inlet gasket assembly 164 and/or with the body 158 of the flow cell cartridge assembly 102.

The outlet gasket assembly 166 includes a plurality of gaskets 212 and a body 214. The body 214 may carry the gaskets 212. Each gasket 212 of the plurality of gaskets 212 is adapted to be coupled adjacent to one of the channel outlets 182 of the flow cell 125 and to allow fluid communication between the channels 126 of the flow cell 125 and the components of the system 100. Sides 216 of the body 214 of the outlet gasket assembly 166 may be adapted to form a snap fit connection with the body 158 of the flow cell cartridge assembly 102.

FIGS. 3-5 and 6A and 6B illustrate different implementations of the flow cell assembly 160 that may be used with the system 100 of FIG. 1A. The channels 126 of the flow cell assemblies 160 shown in FIGS. 3-5 and 6A and 6B may have a volume of about 18.7 microliters (μL) to about 32.4 μL. Other volumes may prove suitable.

Figure 3:
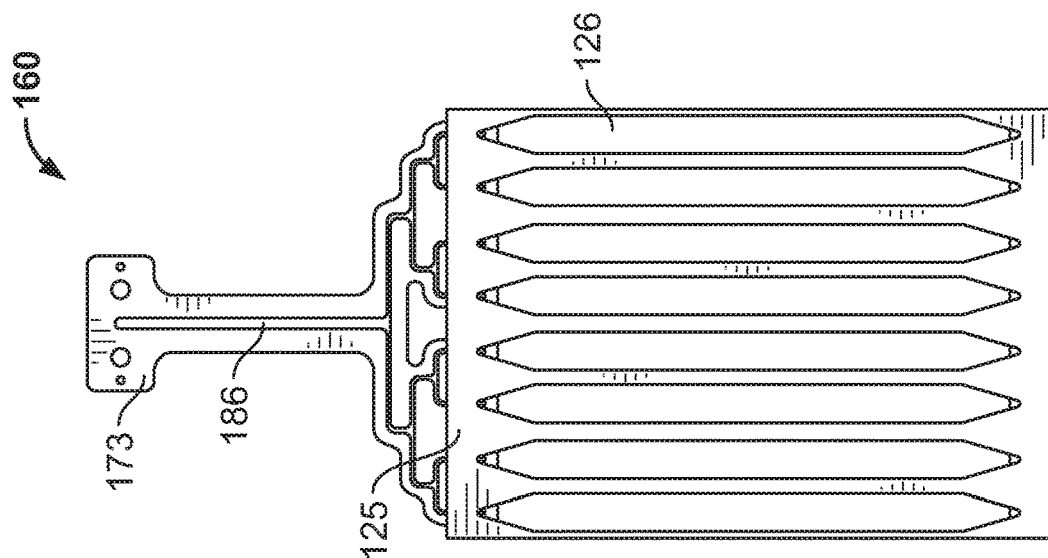
FIG. 3 illustrates a plan view of the flow cell and the flow cell manifold of the flow cell assembly of FIG. 2.

FIG. 3 illustrates a plan view of the flow cell 125 and the flow cell manifold 173 of the flow cell assembly 160 of FIG. 2.

Figure 4:
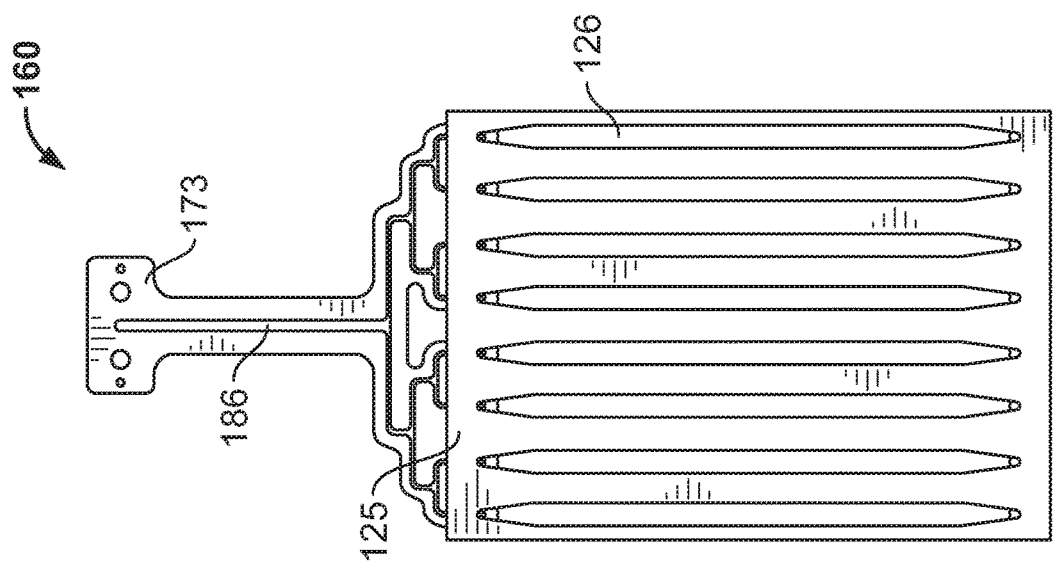
FIG. 4 illustrates a plan view of another implementation of a flow cell and another implementation of a flow cell manifold of a flow cell assembly that can be used with the system of FIG. 1A.

FIG. 4 illustrates a plan view of another implementation of the flow cell 125 and another implementation of the flow cell manifold 173 of the flow cell assembly 160 that can be used with the system 100 of FIG. 1A. In contrast to the implementation of FIG. 3, a width of the channels 126 of the flow cell assembly 160 of FIG. 4 may be less. Spacing and/or the sizing of the fluidic lines 186 of the flow cell manifold 173 of FIG. 4 may be adjusted accordingly.

Figure 5:
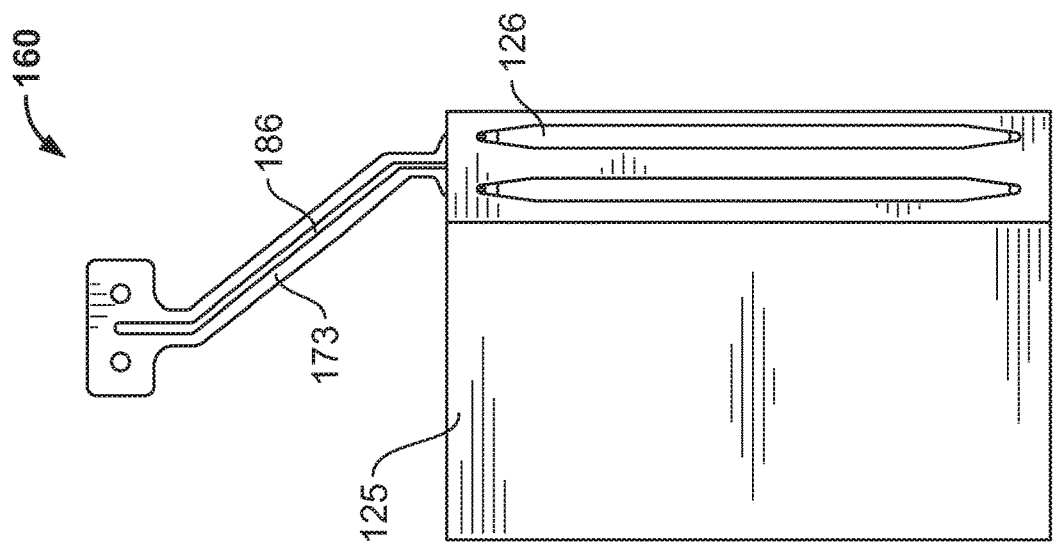
FIG. 5 illustrates a plan view of another implementation of a flow cell and another implementation of a flow cell manifold of a flow cell assembly that can be used with the system of FIG. 1A.

FIG. 5 illustrates a plan view of another implementation of the flow cell 125 and another implementation of the flow cell manifold 173 of the flow cell assembly 160 that can be used with the system 100 of FIG. 1A. In contrast to other implementations disclosed, the flow cell 125 of FIG. 5 includes two of the channels 126 and the flow cell manifold 173 includes less of the fluidic lines 186. The fluidic lines 186 of the flow cell manifold 173 fluidly couple the inlet 184 of the flow cell manifold 173 and the channels 126 of the flow cell 125. While the flow cell 125 of FIG. 5 includes two channels 126, any other number of channels 126 may be included including one.

FIG. 6A illustrates a plan view of another implementation of the flow cell 125 and another implementation of the flow cell manifold 173 of the flow cell assembly 160 that can be used with the system 100 of FIG. 1A. In contrast to the other implementations disclosed, the inlet 184 of the flow cell manifold 173 of FIG. 6A is substantially in line with the outlets 188 of the flow cell manifold 173 and the fluidic lines 186 are arranged accordingly. Thus, a height H of the flow cell manifold 173 of FIG. 6A may be less than the height of the flow cell manifolds 173 shown in FIGS. 3, 4, and 5.

FIG. 6B illustrates an isometric view of the flow cell 125 and the flow cell manifold 173 of FIG. 6A. In the implementation shown, a fluidic line 213 is coupled to the inlet 184 of the flow cell manifold 173 via the gasket 204. The fluidic line 213 may be part of the system 100 of FIG. 1A and includes a coupling 215. The coupling 215 of the fluidic line 213 may be coupled to a port of the central valve 130 to allow fluid communication between the central valve 130 and the flow cell 125, for example.

Figure 7:
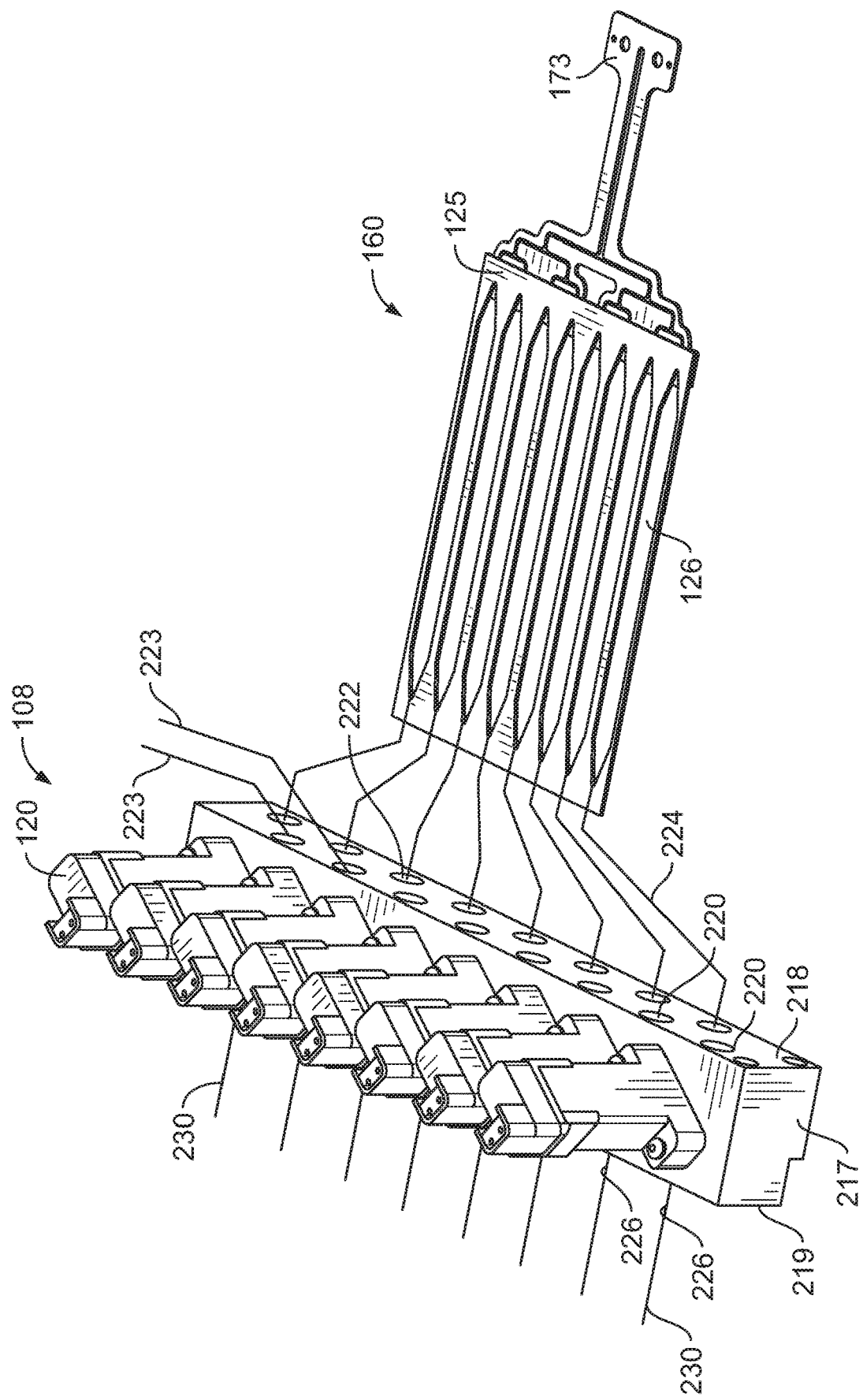
FIG. 7 illustrates an isometric view of an implementation of a sample loading manifold assembly coupled to an implementation of a flow cell assembly that can be used with the system of FIG. 1A.

FIG. 7 illustrates an isometric view of an implementation of the sample loading manifold assembly 108 coupled to an implementation of the flow cell assembly 160 for use with the system 100 of FIG. 1A. In the implementation shown, the sample loading manifold assembly 108 includes a body 217 having a first face 218 and a second face 219 opposite the first face 218. The first face 218 defines a plurality of sample ports 220 and a plurality of flow cell ports 222. Each of the sample ports 220 is coupled to a corresponding port of the sample cartridge interface 119 via separate sample fluidic lines 223. Similarly, each of the flow cell ports 222 is coupled to a corresponding channel 126 of the flow cell 125 via separate flow cell fluidic lines 224. The flow cell fluidic lines 224 may be coupled to ports of the flow cell interface 129. While separate fluidic lines 223, 224 are mentioned coupling the sample ports 220 and the ports of the sample cartridge interface 119 and coupling the flow cell ports 222 and the channels 126 of the flow cell 125 and/or the ports of the flow cell interface 129, one fluidic line may be used to fluidly couple two or more ports.

The second face 219 of the sample loading manifold assembly 108 defines pump ports 226. Each pump port 226 is coupled to a corresponding port 228 of the pump manifold assembly 110 (the corresponding ports 228 of the pump manifold assembly 110 are more clearly shown in FIG. 8) via separate pump-channel fluidic lines 230.

The sample valves 120 of the sample loading manifold assembly 108 are actuatable to allow a sample of interest to be obtained from the sample cartridge 104 and to be loaded into one or more of the channels 126 of the flow cell 125. To obtain the sample of interest from the sample cartridge 104, one or more of the sample valves 120 are actuated into a first position that fluidly communicates the sample cartridge 104 and the pump manifold assembly 110. In the first position of the sample valves 120, the sample of interest may flow through the sample fluidic lines 223 toward and into the sample ports 220, out of the pump ports 226, and into the pump-channel fluidic lines 230 of the pump manifold assembly 110.

To individually deposit the sample of interest into one or more of the channels 126 of the flow cell 125 via the outlet gasket assembly 166, one or more of the sample valves 120 are actuatable into a second position that fluidly communicates the pump manifold assembly 110 and the flow cell 125. In the second position of the sample valves 120, the sample of interest may flow from the pump-channel fluidic lines 230 into the pump ports 226 of the sample loading manifold assembly 108 and out of the flow cell ports 222 of the sample loading manifold assembly 108 toward the corresponding channels 126 of the flow cell 125 via the flow cell fluidic lines 224. The pump manifold assembly 110 may be adapted to dispense the sample of interest into the flow cell 125 at a relatively slow rate to allow a substantially uniform transfer. When the sample of interest is being loaded into the channels 126 of the flow cell 125, the central valve 130 may be positioned to vent the flow cell 125 to the auxiliary waste fluidic line 132. After the sample of interest is dispensed to the flow cell 125, an incubation process may be performed for seeding. In some implementations, 100 microliters (A) of the sample of interest is deposited within the channels 126 of the flow cell 125 at a time, incubated, and seeded. Other volumes may prove suitable. The process of incrementally depositing a smaller amount of the sample of interest within the channels 126, incubating, and seeding may be repeated a threshold number of times.

Prior to obtaining the sample of interest from the sample cartridge 104, in some implementations, the pump manifold assembly 110 may be primed with buffer. The buffer may be obtained from the bypass fluidic line 145. Priming the pump manifold assembly 110 with the buffer may provide the pump manifold assembly 110 with the stroke to dispense the sample of interest into the flow cell 125, for example.

Figure 8:
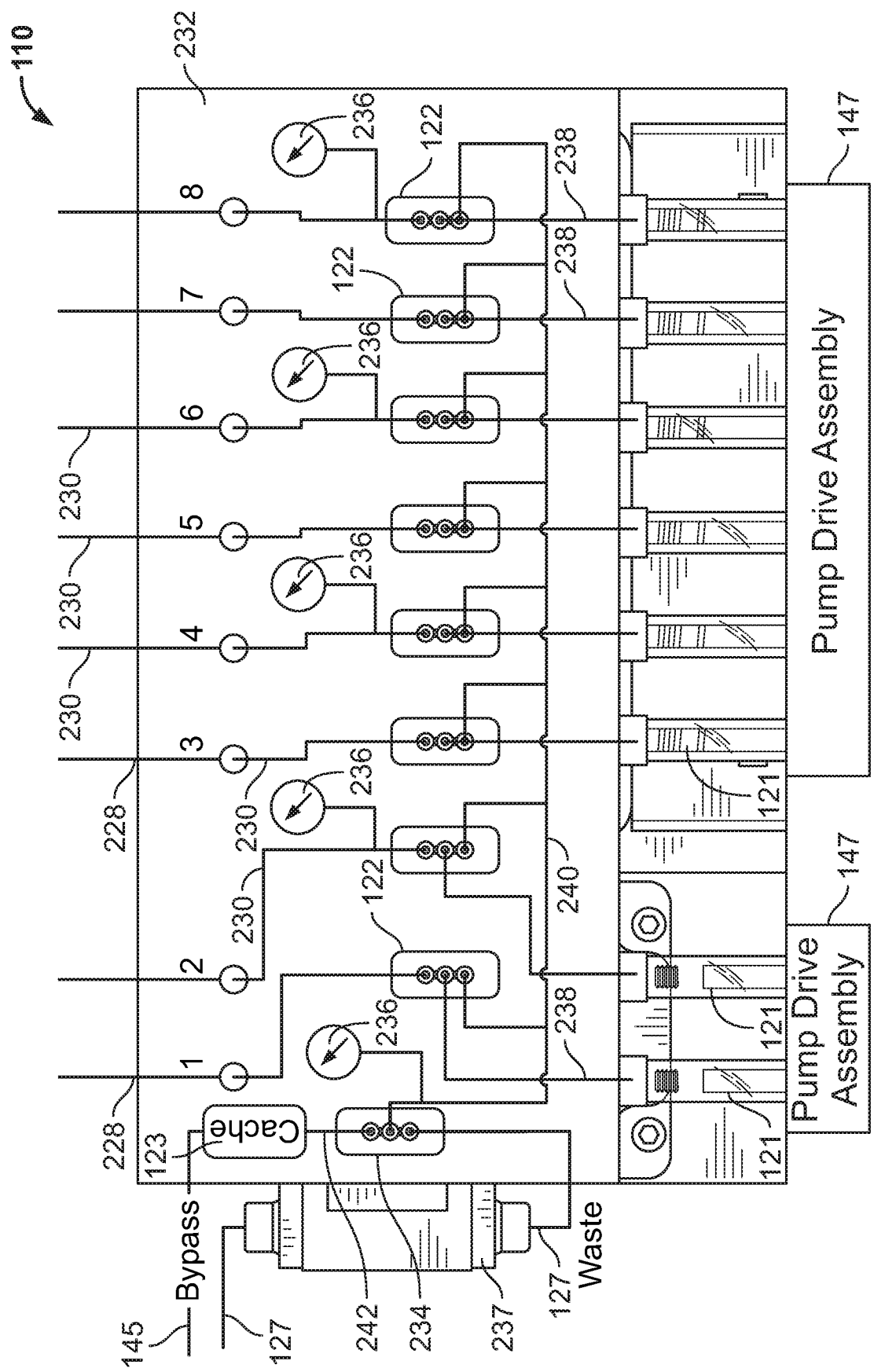
FIG. 8 is a schematic illustration of an implementation of a portion of a pump manifold assembly that can be used with the system of FIG. 1A.

FIG. 8 is a schematic illustration of an implementation of a portion of the pump manifold assembly 110 for use with the system 100 of FIG. 1A. In the implementation shown, the pump manifold assembly 110 includes a body 232 carrying the pump valves 122, a cache valve 234, and the pumps 121. The pumps 121 may be syringe pumps and may be adapted to receive a volume of approximately 500 microliters (µL). Other volumes may prove suitable.

The pump valves 122, the cache valve 234, and/or the pumps 121 are operable to individually control fluid flow to each channel 126 of the plurality of channels 126 of the flow cell 125. In the implementation shown, two pump drive assemblies 147 are provided. The pump drive assemblies 147 may be adapted to individually actuate one or more of the pumps 121 to perform one or more of the operations disclosed. In an implementation, one of the pump drive assemblies 147 may operate two of the pumps 121 and the other of the pump drive assemblies 147 may operate six of the pumps 121. Other arrangements may prove suitable.

The pump valves 122, the cache valve 234, and/or the pumps 121 may be operable to flow one or more reagents through the bypass fluidic line 145 and/or to the primary waste fluidic line 127. The body 232 of the pump manifold assembly 110 may also carry a plurality of sensors 236, 237. The sensors 236, 237 may include pressure sensors or flow rate sensors. Other types of sensors may prove suitable. In another implementation, one or more of the sensors 236, 237 and/or the cache valve 234 may be excluded. In some such implementations, the bypass fluidic line 145 may also be excluded. Other arrangements may prove suitable.

The pump manifold assembly 110 includes the cache 123, the pump-channel fluidic lines 230, a plurality of pump fluidic lines 238, a shared fluidic line 240, a cache fluidic line 242, and the primary waste fluidic line 127. The cache fluidic line 242 is coupled to and between the cache 123 and the cache valve 234. The pump-channel fluidic line 230 and the pump fluidic line 238 may be collectively referred to as a pump-channel fluidic line. In the implementation shown, each pump valve 122 is coupled to a corresponding pump-channel fluidic line 230, a corresponding pump fluidic line 238, and the shared fluidic line 240. Each pump 121 is coupled to a corresponding pump fluidic line 238. The pumps 121 are operable to individually control fluid flow to the pump-channel fluidic line 230 and to one of the channels 126 of the flow cell 125.

The cache valve 234 is coupled to the cache fluidic line 242, the primary waste fluidic line 127, and the shared fluidic line 240. The sensors 236, 237 may be adapted to determine one or more of a pressure value or a flow rate value of one or more of: at least one of the pump-channel fluidic lines 230 or the shared fluidic line 240. Five sensors 236 are coupled to the pump-channel fluidic lines 230. The sensors 236 may be differently positioned. Additional or less sensors including zero sensors may prove suitable.

To draw fluid from or to urge fluid toward the flow cell 125 using one or more of the pumps 121, one or more of the pump valves 122 may be actuated into a first position that fluidly communicates the pump-channel fluidic lines 230 and the pump fluidic lines 238 and one or more of the pumps 121 may be actuated to move the fluid.

To move reaction components toward the waste reservoir 117 using one or more of the pumps 121, one or more of the pump valves 122 may be actuated to a second position that fluidly communicates the pump fluidic lines 238 and the shared fluidic line 240, the cache valve 234 may be actuated to a first position that fluidly communicates the shared fluidic line 240 and the primary waste fluidic line 127, and one or more of the pumps 121 may be actuated to move the fluid.

To perform a mixing operation using one or more reaction components received through the bypass fluidic line 145, the pump valves 122 may be actuated to a second position that fluidly communicates the pump fluidic lines 238 and the shared fluidic line 240, the cache valve 234 may be actuated to a second position that fluidly couples the cache fluidic line 242 and the shared fluidic line 240, and one or more of the pumps 121 may be actuated to move the fluid. In some implementations, a larger volume of the reaction component(s) may be transferred through the bypass fluidic line 145 to prime the shared fluidic line 240 using all of the pumps 121. Then, to increase precision on a subsequent fluid transfer, two of the pumps 121 may be used while the remaining pumps 121 are idle, for example. A different number of pumps 121 including using one pump 121 may be used instead.

Figure 9:
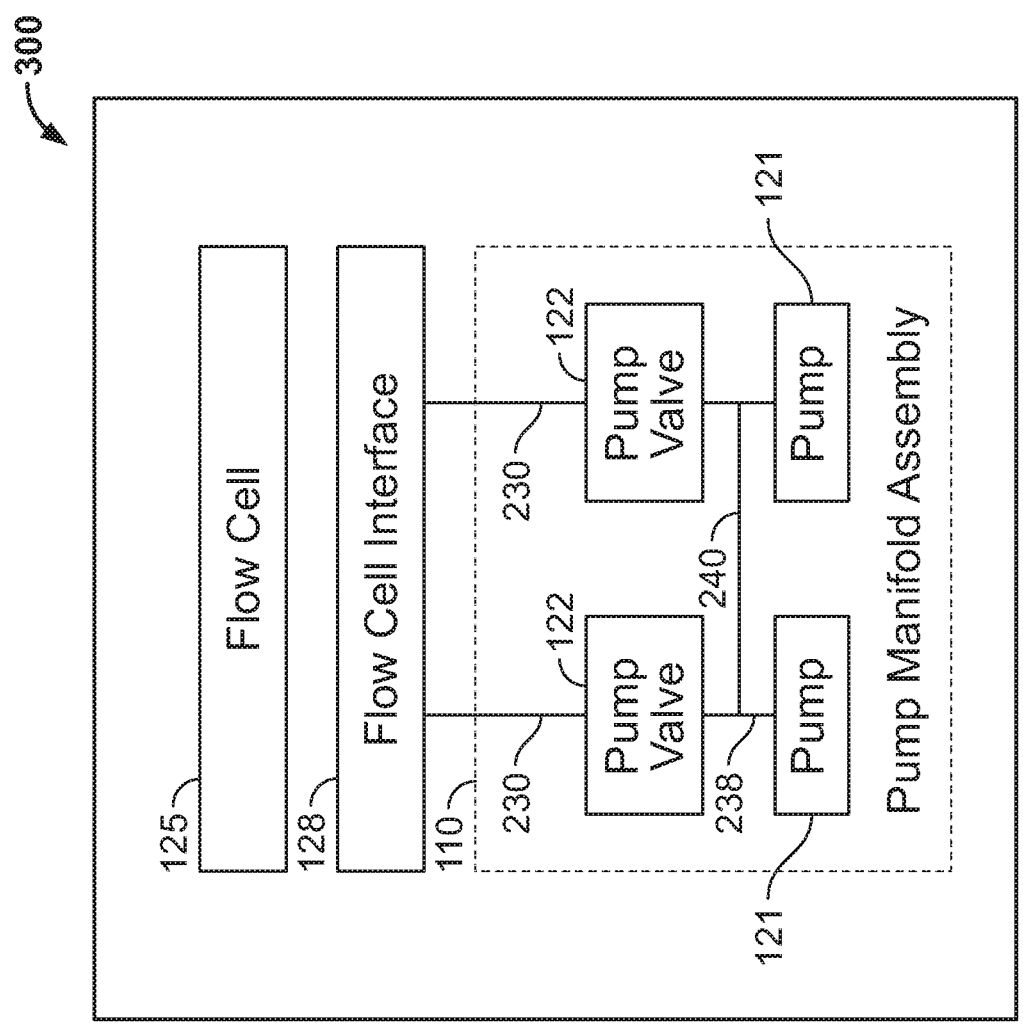
FIG. 9 illustrates a schematic illustration of another implementation of a system in accordance with the teachings of this disclosure including a flow cell interface and a pump manifold assembly.

FIG. 9 illustrates a schematic illustration of another implementation of a system 300 in accordance with the teachings of this disclosure. In the implementation shown, the system 300 includes the flow cell interface 128 and the pump manifold assembly 110. The flow cell interface 128 is adapted to be coupled to the flow cell 125 having the plurality of channels 126. The pump manifold assembly 110 carries the pump valves 122 and the pumps 121. While the system 300 includes two pump valves 122 and two pumps 121, providing the system 300 with a different number of valves 122 and/or pumps 121 may prove suitable.

In the implementation shown, the pump manifold assembly 110 includes the pump-channel fluidic lines 230, the pump fluidic lines 238, and the shared fluidic line 240. The pump valves 122 and the pumps 121 may be operable to individually control fluid flow through each channel 126 of the plurality of channels 126 of the flow cell 125 via the corresponding pump-channel fluidic lines 230. Each pump valve 122 may be coupled to a corresponding pump-channel fluidic line 238, a corresponding pump fluidic line 230, and the shared fluidic line 240. Each pump 121 may be coupled to a corresponding pump fluidic line 238. Other fluidic line arrangements may prove suitable.

Figure 10:
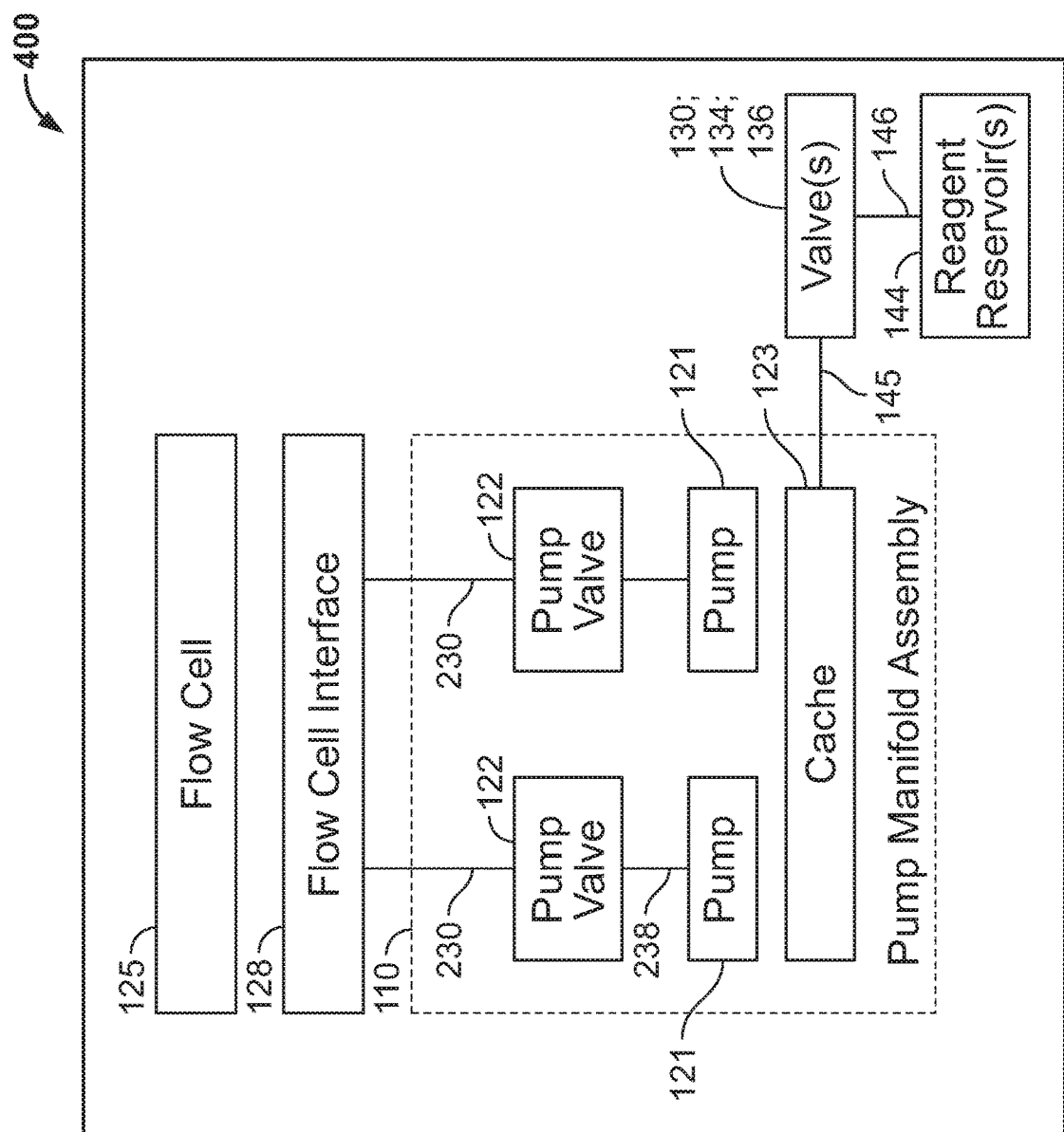
FIG. 10 is a detailed cross-sectional view of the distal portion of the sipper assembly and the sample wells of the sample cartridge of FIG. 1B.

FIG. 10 illustrates a schematic illustration of another implementation of a system 400 in accordance with the teachings of this disclosure. In the implementation shown, the system 400 includes one or more of the valves 130, 134, and/or 136, the flow cell interface 128, the pump manifold assembly 110, and the bypass fluidic line 145. The valves 130, 134 and/or 136 are adapted to be coupled to the corresponding reagent reservoirs 144. The flow cell interface 128 is adapted to be coupled to the flow cell 125 having the plurality of channels 126. The pump manifold assembly 110 includes the pumps 121, the pump valves 122, and the cache 123. Each pump 121 may be operable to individually control fluid flow for each channel 126 of the plurality of channels 126 of the flow cell 125. The bypass fluidic line 145 is operatively coupled between the one or more valves 130, 134, 136 and the cache 123. Other fluidic line arrangements may prove suitable.

Figure 11:
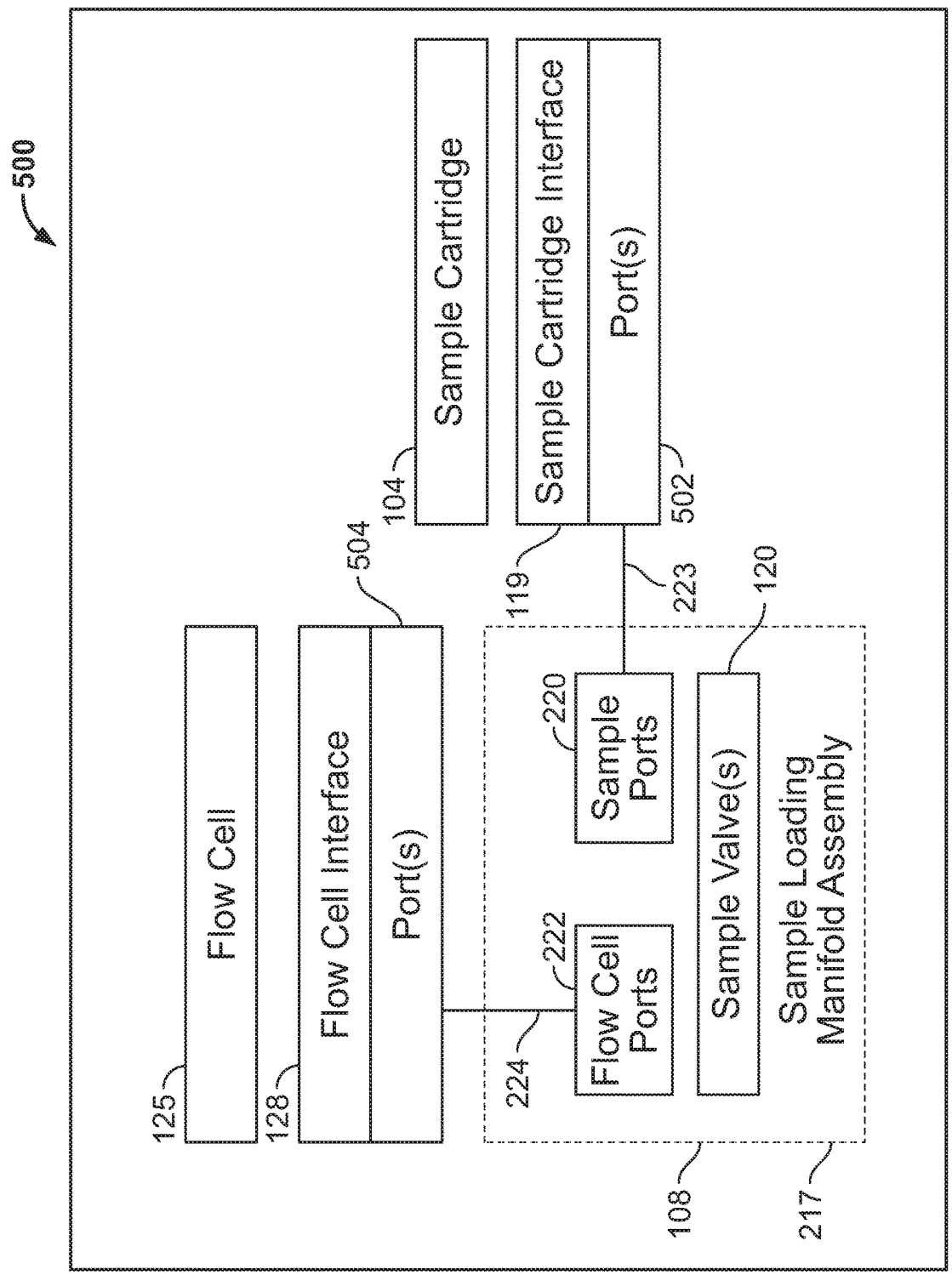
FIG. 11 illustrates a schematic illustration of another implementation of a system in accordance with the teachings of this disclosure including a flow cell interface, a sample loading manifold assembly, and a sample cartridge interface.

FIG. 11 illustrates a schematic illustration of another implementation of a system 500 in accordance with the teachings of this disclosure. In the implementation shown, the system 500 includes the flow cell interface 128, the sample cartridge interface 119, and the sample loading manifold assembly 108. The flow cell interface 119 is adapted to be coupled to the flow cell 125 having the plurality of channels 126. The sample cartridge interface 119 is adapted to be coupled to the sample cartridge 104 and the sample cartridge interface 119 is positioned downstream of the flow cell interface 128. The sample loading manifold assembly 108 is positioned between the flow cell interface 128 and the sample cartridge interface 129.

The sample loading manifold assembly 108 includes the body 217 carrying the plurality of sample valves 120 and defining the sample ports 220 and the flow cell ports 222. Each sample port 220 is coupled to a corresponding port 502 of the sample cartridge interface 119 via one of the sample fluidic lines 223. Each flow cell port 222 is coupled to a corresponding port 504 of the flow cell interface 119. The ports 504 of the flow cell interface 119 are associated with a corresponding one of the channels 126 of the flow cell 125 via the flow cell fluidic lines 224.

Figure 12:
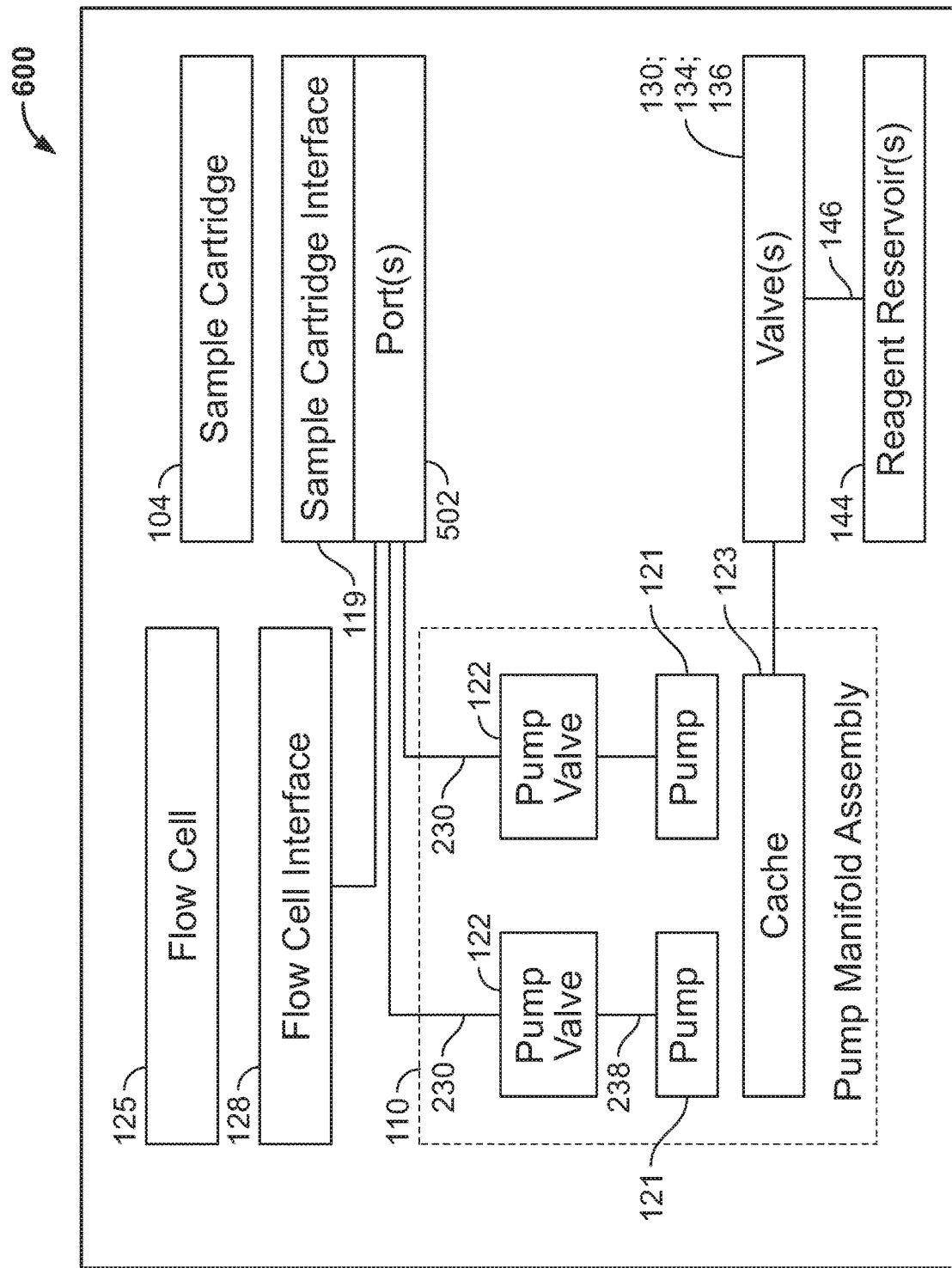
FIG. 12 illustrates a schematic illustration of another implementation of a system in accordance with the teachings of this disclosure including one or more valves, a flow cell interface, a sample cartridge interface, and a pump manifold assembly.

FIG. 12 illustrates a schematic illustration of another implementation of a system 600 in accordance with the teachings of this disclosure. In the implementation shown, the system 600 includes one or more of the valves 130, 134, and/or 136, the flow cell interface 128, the sample cartridge interface 119, and the pump manifold assembly 110. One or more of the valves 130, 134, and/or 136 may be adapted to be coupled to corresponding reagent reservoirs 144. The flow cell interface 128 is adapted to be coupled to the flow cell 125 having the plurality of channels 126. The sample cartridge interface 128 includes the plurality of ports 502 and is adapted to be coupled to the sample cartridge 104 carrying a sample of interest. The sample cartridge interface 119 is positioned downstream of the flow cell interface 128.

In the implementation shown, the pump manifold assembly 110 includes the pumps 121 and the pump valves 122. Each pump 121 and the corresponding pump valve 122 are operable to individually control the flow between each port 502 of the plurality ports 502 of the sample cartridge interface 119 and each channel 126 of the plurality of channels 126 of the flow cell 125 with the sample of interest.

Figure 13A:
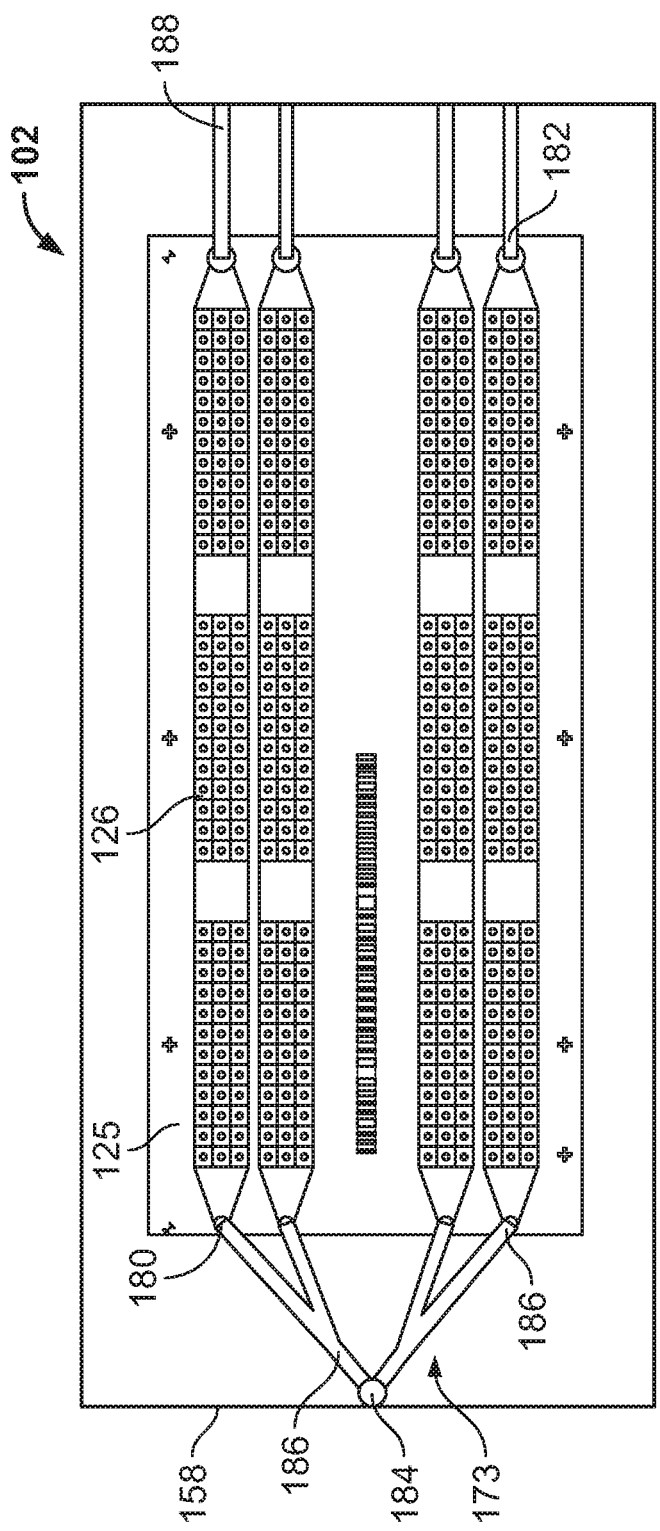
FIG. 13A illustrates a plan view of another implementation of the flow cell and another implementation of the flow cell manifold of a flow cell cartridge assembly that can be used with the system of FIG. 1A.

FIG. 13A illustrates a plan view of another implementation of the flow cell 125 and another implementation of the flow cell manifold 173 of the flow cell cartridge assembly 102 that can be used with the system 100 of FIG. 1A. In contrast to the other implementations disclosed, the body 158 of the flow cell cartridge assembly 102 defines the fluidic lines 186, the inlet 184, and the plurality of outlets 188. In the implementation shown, the fluidic lines 186 are also coupled to the channel outlets 182 of the channels 126 of the flow cell 125 to allow fluidic communication with, for example, the fluidic line 124 and/or the sample loading manifold assembly 108.

Figure 13B:
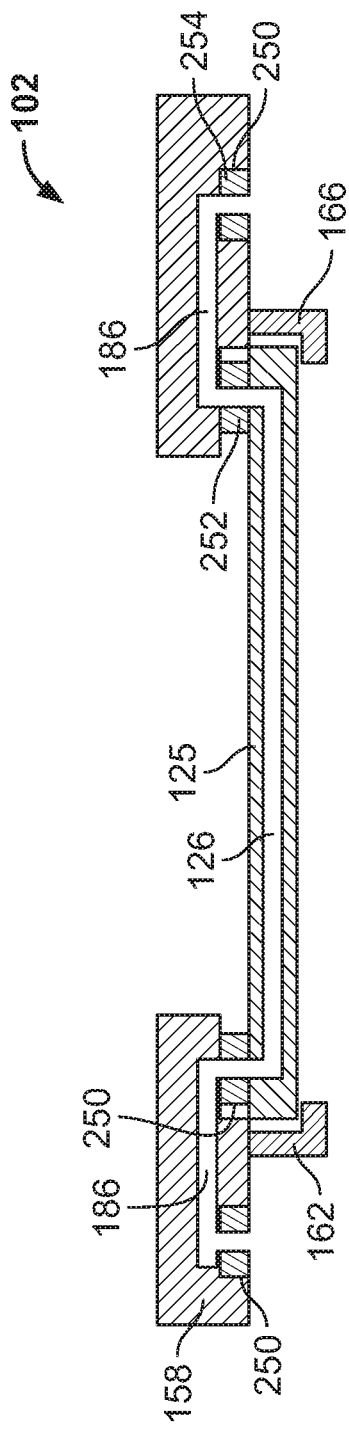
FIG. 13B illustrates a cross-sectional view of the flow cell cartridge assembly of FIG. 13A.

FIG. 13B illustrates a cross-sectional view of the flow cell cartridge assembly 102 of FIG. 13A. In the implementation shown, the body 158 of the flow cell cartridge assembly 102 defines receptacles 250. Inner gaskets 252 and outer gaskets 254 are disposed within the receptacles 250. The inner gaskets 254 may be adapted to matingly engage the flow cell 125 to allow fluid communication between the fluidic lines 186 of the body 158 of the flow cell cartridge assembly 102 and the channels 126 of the flow cell. The outer gaskets 254 may be adapted to matingly engage with the flow cell interface 129 of the system 100 to allow fluid communication between the system 100 and the flow cell cartridge assembly 102.

FIGS. 14-17 illustrates flowcharts for methods of performing a pumping operation and/or a sample of interest loading operation using the system 100 of FIG. 1A or any of the other systems 300, 400, 500, and/or 600 disclosed herein. In the flow charts of FIGS. 14 and 16, the blocks surrounded by solid lines may be included in an implementation of a process 1200 and 1400 while the blocks surrounded in dashed lines may be optional in the implementation of the process. However, regardless of the way the border of the blocks is presented in FIGS. 14-17, the order of execution of the blocks may be changed, and/or some of the blocks described may be changed, eliminated, combined and/or subdivided into multiple blocks.

Figure 14:
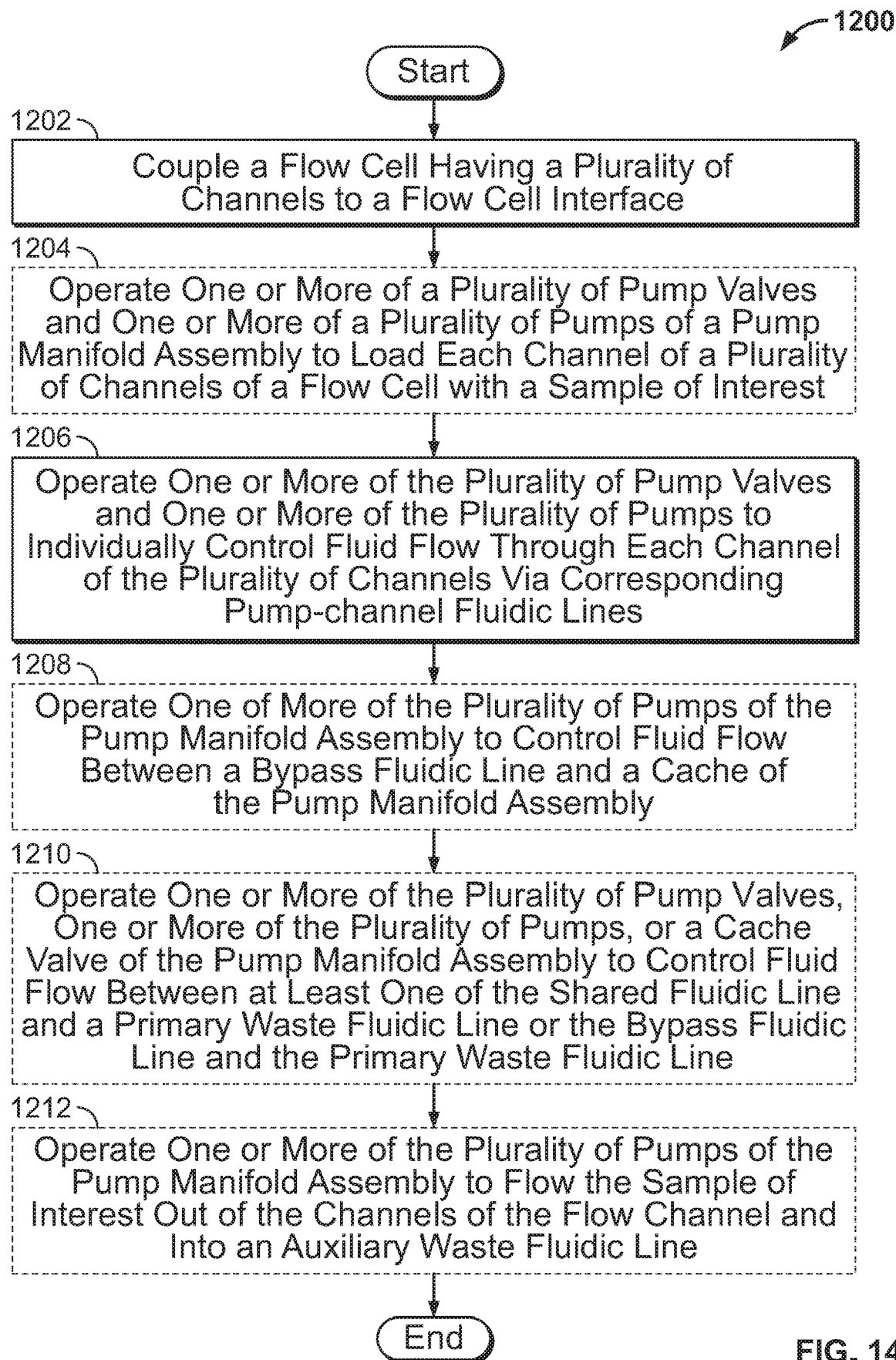
FIG. 14 illustrates a flow chart for a method of performing a pumping operation using the system of FIG. 1A or any of the other systems disclosed herein.

The process 1200 of FIG. 14 begins with the flow cell 125 having the plurality of channels 126 being coupled to the flow cell interface 129 (block 1202). At block 1204, one or more of the plurality of pump valves 122 and one or more of the plurality of pumps 121 of the pump manifold assembly 110 are operated to load each channel 126 of the plurality of channels 126 of the flow cell 125 with a sample of interest.

One or more of the plurality of pump valves 122 and one or more of the plurality of pumps 121 of the pump manifold assembly 110 are operated to individually control fluid flow through each channel 126 of the plurality of channels 126 via a corresponding pump-channel fluidic line 230 (block 1206). Operating one or more of the plurality of pumps 121 may include flowing the sample of interest into each channel 126 in a first direction. Operating one or more of the plurality of pumps 121 may also include flowing reagent through the channels 126 of the flow cell 125 in a second direction opposite the first direction. The pump manifold assembly 110 may include the plurality of pump-channel fluidic lines 230, the plurality of pump fluidic lines 238, and the shared fluidic line 240. Each pump valve 122 may be coupled to a corresponding pump-channel fluidic line 230, a corresponding pump fluidic line 238, and the shared fluidic line 240. Each pump 121 may be coupled to a corresponding pump fluidic line 238.

One of more of the plurality of pumps 121 of the pump manifold assembly 110 are operated to control fluid flow between the bypass fluidic line 145 and the cache 123 of the pump manifold assembly 110 (block 1208). In some implementations, the bypass fluidic line 145 couples the cache 123 and the bypass valve 136.

At block 1210, one or more of the pump valves 122, one or more of the pumps 121, or the cache valve 234 of the pump manifold assembly 110 are operated to control fluid flow between at least one of the shared fluidic line 240 and the primary waste fluidic line 127 or between the bypass fluidic line 145 and the primary waste fluidic line 127. One or more of the pumps 121 of the pump manifold assembly 110 are operated to flow the sample of interest out of the channels 126 of the flow channel 125 and into the auxiliary waste fluidic line 132 (block 1212).

Figure 15:
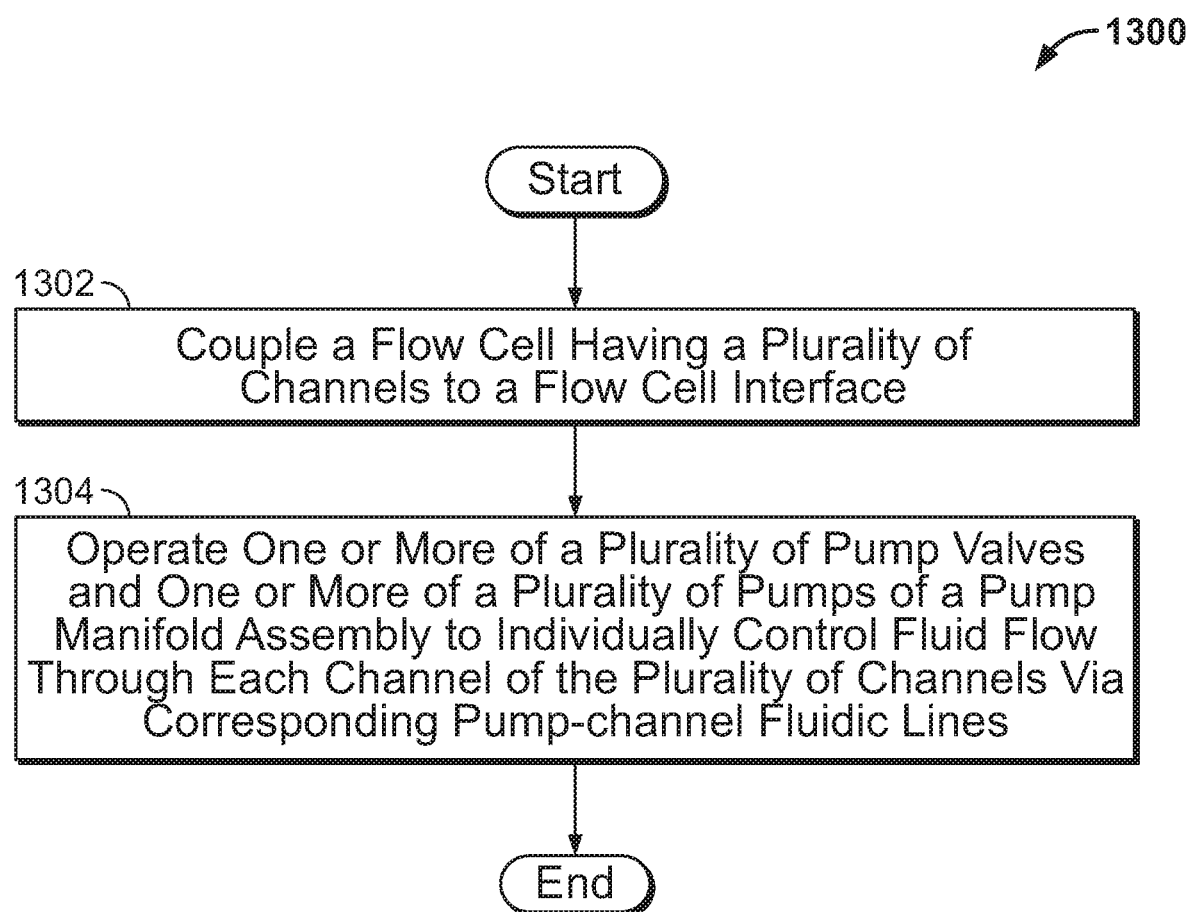
FIG. 15 illustrates a flow chart for another method of performing a pumping operation using the system of FIG. 1A or any of the other systems disclosed herein.

The process 1300 of FIG. 15 begins with the flow cell 125 having the plurality of channels 126 being coupled to the flow cell interface 129 (block 1302). At block 1304, one or more of the plurality of pump valves 122 and one or more of the plurality of pumps 121 of the pump manifold assembly 110 are operated to individually control fluid flow through each channel 126 of the plurality of channels 126 via the corresponding pump-channel fluidic lines 230. The pump manifold assembly 110 may include the plurality of pump-channel fluidic lines 230, the plurality of pump fluidic lines 238, and the shared fluidic line 240. Each pump valve 122 may be coupled to a corresponding pump-channel fluidic line 230, a corresponding pump fluidic line 238, and the shared fluidic line 240. Each pump 121 may be coupled to a corresponding pump fluidic line 238.

Figure 16:
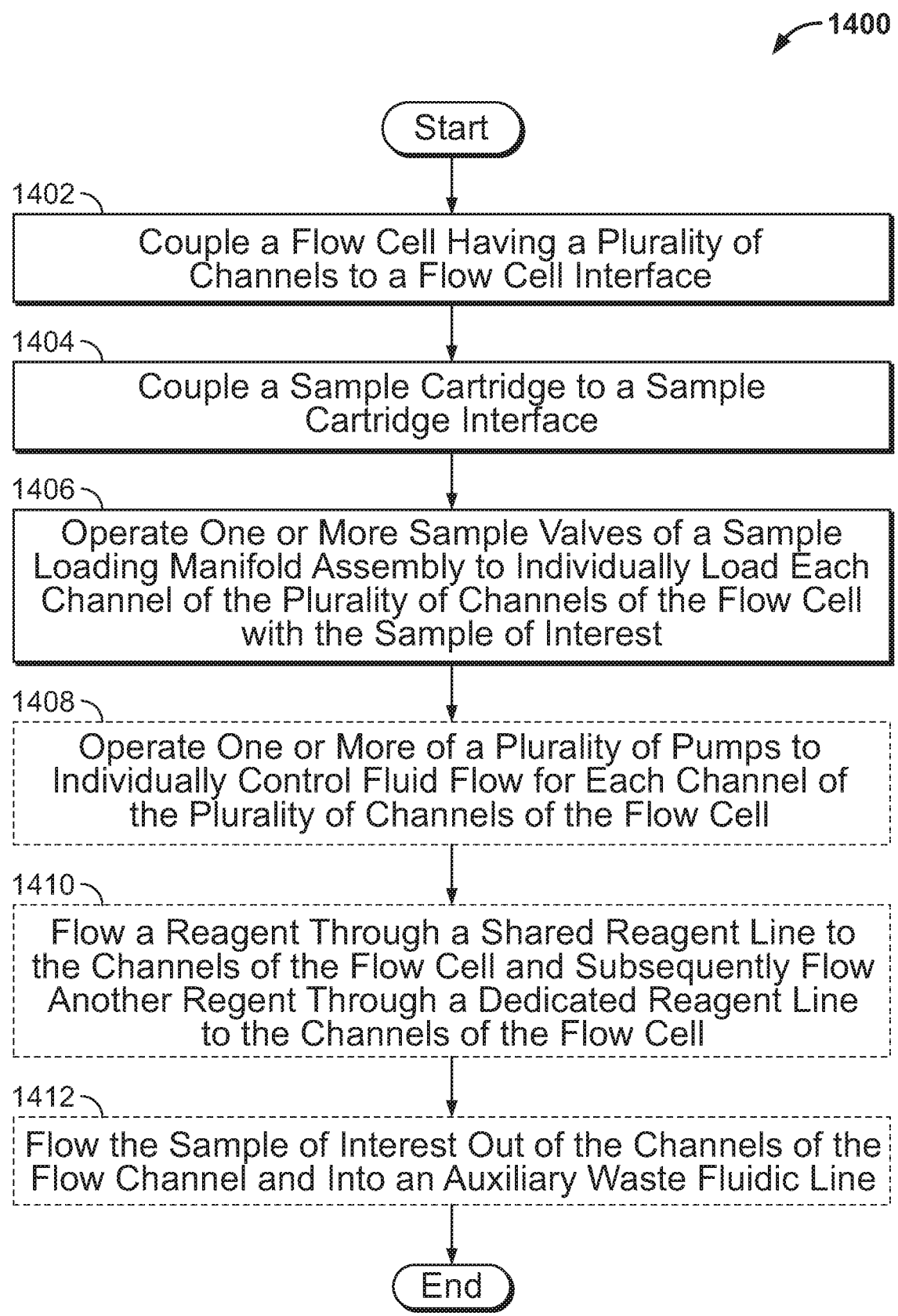
FIG. 16 illustrates a flow chart for a method of performing a sample of interest loading operation using the system of FIG. 1A or any of the other systems disclosed herein.

The process 1400 of FIG. 16 begins with the flow cell 125 having the plurality of channels 126 being coupled to the flow cell interface 129 (block 1402). At block 1404, the sample cartridge 104 is coupled to the sample cartridge interface 119. The sample cartridge interface 119 may be positioned downstream of the flow cell interface 129. The sample cartridge 104 may carry a sample of interest. One or more of the sample valves 120 of the sample loading manifold assembly 108 are operated to individually load each channel 126 of the plurality of channels 126 of the flow cell 125 with a sample of interest (block 1406).

In some implementations, operating one or more sample valves 120 includes moving a sample of interest from the sample cartridge 104 to a corresponding sample port 220 of the sample loading manifold assembly 108, out of an associated pump port 226 of the sample loading manifold assembly 108, and into a corresponding pump-channel fluidic line 230 of the pump manifold assembly 110. Operating one or more sample valves 120 may also include moving a sample of interest from a corresponding pump-channel fluidic line 230, through the associated pump port 226, and through the flow cell port 222 of the sample loading manifold assembly 108. Each flow cell port 222 may be coupled to a corresponding port 502 of the flow cell interface 119 and associated with one of the channels 126 of the plurality of channels 126 of the flow cell 125.

Each sample valve 120 of the sample loading manifold assembly 108 may be operable to fluidly communicate one of the ports 502 of the sample cartridge interface 119 and one or more of the pumps 121 and to fluidly communicate a pump 121 and a corresponding channel 126 of the plurality of channels 126 of the flow cell 125. In some implementations, operating one or more sample valves 120 includes flowing the sample of interest into each channel 126 of the flow cell 125 in a first direction. The process 1400 may also include controlling a flow of reagent through the channels 126 of the flow cell 125 in a second direction opposite the first direction.

At block 1408, one or more of the plurality of pumps 121 are operated to individually control fluid flow for each channel 126 of the plurality of channels 126 of the flow cell 125. Reagent may be flowed through the shared reagent fluidic line 138 to the channels 126 of the flow cell 125 and subsequently another reagent may be flowed through the dedicated reagent fluidic line 140 and/or 142 to the channels 126 of the flow cell 125 (block 1410). At block 1412, the sample of interest is flowed out of the channels 126 of the flow cell 125 and into the auxiliary waste fluidic line 132.

Figure 17:
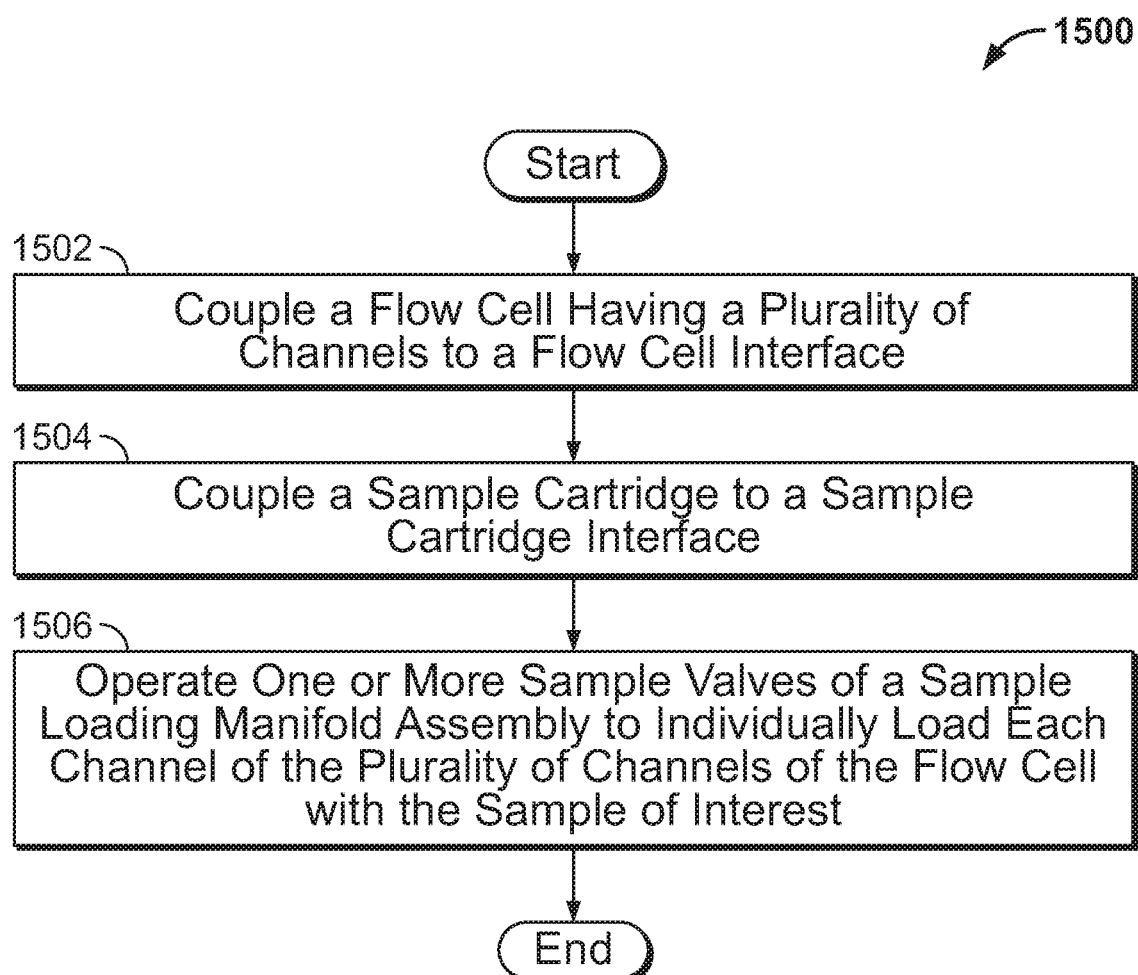
FIG. 17 illustrates a flow chart for another method of performing a sample of interest loading operation using the system of FIG. 1A or any of the other systems disclosed herein.

The process 1500 of FIG. 17 begins with the flow cell 125 having the plurality of channels 126 being coupled to the flow cell interface 129 (block 1502). At block 1504, the sample cartridge 104 is coupled to the sample cartridge interface 119. The sample cartridge interface 119 may be positioned downstream of the flow cell interface 129. The sample cartridge 104 may carry one or more samples of interest. One or more of the sample valves 120 of the sample loading manifold assembly 108 are operated to individually load each channel 126 of the plurality of channels 126 of the flow cell 125 with a corresponding sample of interest or the same sample of interest (block 1506).

A method comprises coupling a flow cell having a plurality of channels to a flow cell interface, the flow cell interface fluidically coupled to a pump manifold assembly; and moving a first pump valve of a plurality of pump valves of the pump manifold assembly to a first position to fluidically connect a first channel of the plurality of channels with a first pump of a plurality of pumps. The first pump fluidically connected to the first channel via a first pump-channel fluidic line. The method comprises pumping a first volume of a first reagent through the first channel using the first pump via the first pump-channel fluidic line and moving the first pump valve of the plurality of pump valves to a second position to fluidically connect the pump and the first pump-channel fluidic line with a shared fluidic line in fluid communication with a waste reservoir. The method comprises pumping the first volume of the first reagent into the waste reservoir through the shared fluidic line and moving a second pump valve of a plurality of pump valves to a first position to fluidically connect a second channel of the plurality of channels with a second pump of the plurality of pumps. The second pump fluidically connected to the second channel via a second pump-channel fluidic line. The method comprises pumping a second volume of the first reagent into the second channel using the second pump via the second pump-channel fluidic line and moving the second pump valve of the plurality of pump valves to a second position to fluidically connect the second pump and the second pump-channel fluidic line with the shared fluidic line in fluid communication with the waste reservoir. The method comprises pumping the second volume of the first reagent into the waste reservoir through the shared fluidic line.

The method of any one or more of the preceding implementations and/or any one or more of the implementations disclosed below, further comprising moving a bypass valve to a first position to fluidically couple a bypass fluidic line and a cache of the pump manifold assembly, and pumping a third volume of the first reagent or another reagent through the bypass fluidic line and into the cache.

The method of any one or more of the preceding implementations and/or any one or more of the implementations disclosed below, further comprising actuating one or more of the plurality of pump valves, one or more of the plurality of pumps, or a cache valve of the pump manifold assembly and pumping reagent between at least one of the shared fluidic line and a primary waste fluidic line in fluidic communication with the waste reservoir or the bypass fluidic line and the primary waste fluidic line.

The method of any one or more of the preceding implementations and/or any one or more of the implementations disclosed below, further comprising operating one or more of the plurality of pump valves and one or more of the plurality of pumps of the pump manifold assembly to load one or more of the plurality of channels of the flow cell with a sample of interest.

The method of any one or more of the preceding implementations and/or any one or more of the implementations disclosed below, operating the one or more of the plurality of pumps to load one or more of the channels of the plurality of channels of the flow cell with the sample of interest includes flowing the sample of interest in a first direction. The method further comprises operating one or more of the plurality of pumps of the pump manifold assembly to control a flow of reagent through the channels of the flow cell in a second direction opposite the first direction.

The method of any one or more of the preceding implementations and/or any one or more of the implementations disclosed below, further comprising operating one or more of the plurality of pumps of the pump manifold assembly to flow the sample of interest out of the one or more channels of the flow cell and into an auxiliary waste fluidic line, the auxiliary waste fluidic line being upstream of the flow cell interface.

An apparatus comprising a flow cell interface adapted to be coupled to a flow cell having a plurality of channels; and a pump manifold assembly carrying a plurality of pump valves and a plurality of pumps and comprising a plurality of pump-channel fluidic lines, a plurality of pump fluidic lines, and a shared fluidic line. The pump valves and the pumps are operable to individually control fluid flow through each channel of the plurality of channels of the flow cell via the corresponding pump-channel fluidic lines. Each pump valve being coupled to a corresponding pump-channel fluidic line, a corresponding pump fluidic line, and the shared fluidic line and being movable between a first position fluidically coupling a corresponding channel of the plurality of channels, a corresponding pump-channel fluidic line, and a corresponding pump fluidic line and a second position fluidically coupling a corresponding pump fluidic line, the shared fluidic line, and a waste reservoir. Each pump coupled to a corresponding pump fluidic line.

The apparatus of any one or more of the preceding implementations and/or any one or more of the implementations disclosed below, the pump manifold assembly further comprises a cache. The apparatus further comprises a bypass valve and a bypass fluidic line coupling the bypass valve and the cache.

The apparatus of any one or more of the preceding implementations and/or any one or more of the implementations disclosed below, the pump manifold assembly further comprises a cache valve and a cache fluidic line. The cache valve being coupled to the cache fluidic line and the shared fluidic line.

The apparatus of any one or more of the preceding implementations and/or any one or more of the implementations disclosed below, the pump manifold assembly further comprises a primary waste fluidic line coupled to the waste reservoir, the cache valve coupled to the primary waste fluidic line.

The apparatus of any one or more of the preceding implementations and/or any one or more of the implementations disclosed below, the pump manifold assembly further comprises a plurality of sensors adapted to determine one or more of a pressure value or a flow rate value of one or more of: at least one of the pump-channel fluidic lines or the shared fluidic line.

The apparatus of any one or more of the preceding implementations and/or any one or more of the implementations disclosed below, further comprising a pair of pump drive assemblies that are operable to drive the plurality of pumps.

The apparatus of any one or more of the preceding implementations and/or any one or more of the implementations disclosed below, further comprising a sample cartridge interface adapted to be coupled to a sample cartridge, the sample cartridge interface positioned downstream of the flow cell interface.

The apparatus of any one or more of the preceding implementations and/or any one or more of the implementations disclosed below, further comprising a sample loading manifold assembly positioned between the flow cell interface and the sample cartridge interface and comprising or including a body carrying a plurality of sample valves and defining a plurality of sample ports, a plurality of flow cell ports, and a plurality of pump ports. Each sample port coupled to a corresponding port of the sample cartridge interface via a sample fluidic line. Each flow cell port coupled to a corresponding port of the flow cell interface and associated with one of the channels of the plurality of channels of the flow cell via a flow cell fluidic line. Each pump port coupled to a corresponding pump-channel fluidic line of the plurality of pump-channel fluidic lines.

The apparatus of any one or more of the preceding implementations and/or any one or more of the implementations disclosed below, the sample valves of the sample loading manifold assembly and pumps of the pump manifold assembly are operable to individually load each channel of the plurality of channels of the flow cell with a sample of interest.

The apparatus of any one or more of the preceding implementations and/or any one or more of the implementations disclosed below, each sample valve is operable to fluidly communicate a port of the sample cartridge and a corresponding pump of the plurality of pumps of the pump manifold assembly and to fluidly communicate a pump of the plurality of pumps of the pump manifold assembly and a corresponding channel of the plurality of channels of the flow cell.

The apparatus of any one or more of the preceding implementations and/or any one or more of the implementations disclosed below, further comprising a central valve and an auxiliary waste fluidic line coupled to the central valve and adapted to be coupled to the waste reservoir, the auxiliary waste fluidic line being positioned upstream of the flow cell interface.

The apparatus of any one or more of the preceding implementations and/or any one or more of the implementations disclosed below, further comprising a shared line valve, a bypass valve, a plurality of dedicated reagent fluidic lines, and a shared reagent fluidic line. The shared reagent fluidic line coupling the shared line valve and the central valve and adapted to flow one or more reagents to the flow cell via the central valve. Each dedicated reagent fluidic line coupling the bypass valve and the central valve and adapted to flow a reagent to the flow cell via the central valve.

An apparatus comprises one or more valves adapted to be coupled to corresponding reagent reservoirs and a flow cell interface adapted to be coupled to a flow cell having a plurality of channels The apparatus comprises a pump manifold assembly having a plurality of pumps, a plurality of pump valves, and a cache. Each pump is operable to individually control fluid flow for each channel of the plurality of channels of the flow cell and a bypass fluidic line operatively coupled between the one or more valves and the cache.

The apparatus of any one or more of the preceding implementations and/or any one or more of the implementations disclosed below, further comprising a sample loading manifold assembly having a plurality of sample valves. Each sample valve and a corresponding pump of the pump manifold assembly is operable to individually load each channel of the plurality of channels of the flow cell. The sample loading manifold assembly being positioned downstream of the flow cell.

The apparatus of any one or more of the preceding implementations and/or any one or more of the implementations disclosed below, further comprising a flow cell assembly including the flow cell having the plurality of channels and a flow cell manifold. The flow cell manifold includes an inlet, a plurality of fluidic lines, and a plurality of outlets. Each outlet of the flow cell manifold is coupled to a corresponding channel of the flow cell.

A method comprises coupling a flow cell having a first channel and a second channel to a flow cell interface and moving a first sample valve of one or more sample valves of a sample loading manifold assembly to a first position to fluidically couple a first sample reservoir of a sample cartridge to an outlet of the first channel of the flow cell. The method comprises pumping a first sample of interest from the first sample reservoir into the first channel of the flow cell through the outlet of the first channel. An inlet of the first channel is fluidically connected to a waste reservoir via a central valve when the central valve is in a first position. The method comprises moving the first sample valve of the one or more sample valves of the sample loading manifold assembly to a second position to fluidically disconnect the first sample reservoir of the sample cartridge and to fluidically connect the outlet of the first channel with the waste reservoir and moving the central valve to a second position to fluidically couple a reagent reservoir with the first channel and the second channel of the flow cell. The method comprises pumping a first volume of reagent through the first channel and into the waste reservoir.

The method of any one or more of the preceding implementations and/or any one or more of the implementations disclosed below, pumping the first sample of interest from the first sample reservoir into the first channel of the flow cell includes moving the first sample of interest from the sample cartridge to a corresponding sample port of the sample loading manifold assembly, out of an associated pump port of the sample loading manifold assembly, and into a pump-channel fluidic line of a pump manifold assembly, and moving the first sample of interest from the pump-channel fluidic line, through the associated pump port, and through a corresponding flow cell port of the sample loading manifold assembly. Each flow cell port being coupled to a corresponding port of the flow cell interface and associated with one of the channels of the plurality of channels of the flow cell.

The method of any one or more of the preceding implementations and/or any one or more of the implementations disclosed below, moving the first sample valve of the one or more sample valves to the first position includes fluidically coupling a port of a sample cartridge interface and a corresponding pump and moving the first sample valve of the one or more sample valves to the second position includes fluidically coupling the corresponding pump and the first channel of the plurality of channels of the flow cell.

The method of any one or more of the preceding implementations and/or any one or more of the implementations disclosed below, further comprising operating one or more of a plurality of pumps to individually control fluid flow for each channel of the plurality of channels of the flow cell.

The method of any one or more of the preceding implementations and/or any one or more of the implementations disclosed below, further comprising flowing the first sample of interest out of the first channel of the flow cell and into an auxiliary waste fluidic line, the auxiliary waste fluidic line being upstream of the flow cell and fluidically coupled to the central valve and the waste reservoir.

The method of any one or more of the preceding implementations and/or any one or more of the implementations disclosed below, further comprising flowing a reagent through a shared reagent fluidic line to the plurality of channels of the flow cell and subsequently flowing another reagent through a dedicated reagent fluidic line to the plurality of channels of the flow cell.

An apparatus comprising a flow cell interface adapted to be coupled to a flow cell having a plurality of channels and a central valve and an auxiliary waste fluidic line coupled to the central valve and adapted to be coupled to a waste reservoir. The central valve coupled to the flow cell interface and movable between a first position fluidically connecting an inlet of the plurality of channels to the auxiliary waste fluidic line and a second position fluidically connecting a reagent reservoir and the plurality of channels. The apparatus comprises a sample cartridge interface adapted to be coupled to a sample cartridge. The sample cartridge interface positioned downstream of the flow cell interface. The apparatus comprises a sample loading manifold assembly positioned between the flow cell interface and the sample cartridge interface and comprises a body carrying a plurality of sample valves and defining a plurality of sample ports and a plurality of flow cell ports. Each sample port coupled to a corresponding port of the sample cartridge interface via a sample fluidic line. Each flow cell port coupled to a corresponding port of the flow cell interface and associated with one of the plurality of channels of the flow cell via a flow cell fluidic line. Each of the sample valves are movable between a first position fluidically connecting a corresponding sample port and a corresponding outlet of the plurality of channels and a second position fluidically coupling the corresponding outlet of the plurality of channels and the waste reservoir.

The apparatus of any one or more of the preceding implementations and/or any one or more of the implementations disclosed below, the sample valves are operable to individually load each channel of the plurality of channels of the flow cell.

The apparatus of any one or more of the preceding implementations and/or any one or more of the implementations disclosed below, further comprising a plurality of pumps and wherein the body of the sample loading manifold assembly further defines a plurality of pump ports. Each pump port being coupled to one of the pumps of the plurality of pumps via a pump-channel fluidic line.

The apparatus of any one or more of the preceding implementations and/or any one or more of the implementations disclosed below, each sample valve is operable to fluidly communicate a port of the sample cartridge and a corresponding pump of the plurality of pumps and to fluidly communicate a pump of the plurality of pumps and a corresponding channel of the plurality of channels of the flow cell.

The apparatus of any one or more of the preceding implementations and/or any one or more of the implementations disclosed below, the pumps are operable to individually control fluid flow for each channel of the plurality of channels of the flow cell.

The apparatus of any one or more of the preceding implementations and/or any one or more of the implementations disclosed below, further comprising a pump manifold assembly comprising the pumps and a cache. Further comprising a bypass valve and a bypass fluidic line coupling the bypass valve and the cache.

The apparatus of any one or more of the preceding implementations and/or any one or more of the implementations disclosed below, further comprising a shared line valve, a plurality of dedicated reagent fluidic lines, and a shared reagent fluidic line. The shared reagent fluidic line coupling the shared line valve and the central valve and adapted to flow one or more reagents to the flow cell. E ach dedicated reagent fluidic line coupling the bypass fluidic line and the central valve and adapted to flow toward the flow cell.

The apparatus of any one or more of the preceding implementations and/or any one or more of the implementations disclosed below, the pump manifold assembly carries a plurality of pump valves and a cache valve and includes a plurality of pump-channel fluidic lines, a plurality of pump fluidic lines, a shared fluidic line, a cache fluidic line, and a primary waste fluidic line. The cache fluidic line being coupled to and between the cache and the cache valve. Each pump valve being coupled to a corresponding pump-channel fluidic line, a corresponding pump fluidic line, and the shared fluidic line. The cache valve being coupled to the cache fluidic line, the primary waste fluidic line, and the shared fluidic line.

The apparatus of any one or more of the preceding implementations and/or any one or more of the implementations disclosed below, the pump valves and the pumps are operable to individually control fluid flow for each channel of the plurality of channels of the flow cell and the pump valves, the cache valve, and the pumps are operable to control fluid flow between the bypass fluidic line and the shared fluidic line.

The apparatus of any one or more of the preceding implementations and/or any one or more of the implementations disclosed below, the pump valves, the cache valve, and the pumps are operable to control fluid flow between the shared fluidic line and the primary waste fluidic line.

An apparatus comprises one or more valves adapted to be coupled to corresponding reagent reservoirs and a flow cell interface adapted to be coupled to a flow cell. The apparatus comprises a sample cartridge interface having one or more ports and adapted to be coupled to a sample cartridge carrying a sample of interest. The sample cartridge interface positioned downstream of the flow cell interface. The apparatus comprises a pump adapted to load a channel of the flow cell with the sample of interest via the flow cell interface associated with an outlet of the flow cell and a corresponding port of the sample cartridge interface.

The apparatus of any one or more of the preceding implementations and/or any one or more of the implementations disclosed below, further comprising a pump manifold assembly having a plurality of pumps including the pump and a plurality of pump valves. Each pump and a corresponding pump valve are operable to individually control the flow of the sample of interest between each port of the one or more ports of the sample cartridge interface and a corresponding channel of the flow cell.

The apparatus of any one or more of the preceding implementations and/or any one or more of the implementations disclosed below, further comprising a sample loading manifold assembly having a plurality of sample valves. Each sample valve is operable to individually load each channel of the plurality of channels of the flow cell with the sample of interest.

The apparatus of any one or more of the preceding implementations and/or any one or more of the implementations disclosed below, further comprising a flow cell assembly including the flow cell having a plurality of channels and a flow cell manifold. The flow cell manifold includes an inlet, a plurality of fluidic lines, and a plurality of outlets. Each outlet of the flow cell manifold is coupled to a corresponding channel of the flow cell.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
   a flow cell interface adapted to be coupled to a flow cell having a plurality of channels, a front, and a rear; and
   a pump manifold assembly carrying a plurality of pump valves and a plurality of pumps and comprising a plurality of pump-channel fluidic lines, a plurality of pump fluidic lines, and a shared fluidic line, the pump valves and the pumps are operable to individually control fluid flow through each channel of the plurality of channels of the flow cell via the corresponding pump-channel fluidic lines, each pump valve being coupled to a corresponding pump-channel fluidic line, a corresponding pump fluidic line, and the shared fluidic line and being movable between a first position fluidically coupling a corresponding channel of the plurality of channels, a corresponding pump-channel fluidic line, and a corresponding pump fluidic line and a second position fluidically coupling a corresponding pump fluidic line, the shared fluidic line, and a waste reservoir, each pump coupled to a corresponding pump fluidic line;
   a reagent reservoir positioned upstream of the flow cell interface and fluidly connected to the front of the flow cell interface; and
   a sample cartridge comprising a plurality of sample wells and positioned downstream of the flow cell interface, fluidically between the flow cell interface and the pump manifold assembly, and fluidly connected to the rear of the flow cell interface;
   wherein when the flow cell interface is coupled to the flow cell, the front of the flow cell is fluidly connected to the reagent reservoir, and the rear of the flow cell is fluidly connected to the sample cartridge, the plurality of pumps is operable to load one or more of the channels of the plurality of channels of the flow cell with a sample of interest from the sample cartridge by flowing the sample of interest in a first direction into the one or more channels of the flow cell, and the plurality of pumps is operable to flow reagent from the reagent reservoir through the channels of the flow cell in a second direction, opposite the first direction, and
wherein the waste reservoir is fluidly connected to the front of the flow cell by an auxiliary waste fluidic line and to the rear of the flow cell by a primary waste fluidic line.

2. The apparatus of claim 1, wherein the pump manifold assembly further comprises a cache adapted to temporarily store one or more reaction components, and further comprising a bypass valve and a bypass fluidic line coupling the bypass valve and the cache.

3. The apparatus of claim 2, wherein the pump manifold assembly further comprises a cache valve and a cache fluidic line, the cache valve being coupled to the cache fluidic line and the shared fluidic line.

4. The apparatus of claim 3, wherein the cache valve is coupled to the primary waste fluidic line.

5. The apparatus of claim 1, wherein the pump manifold assembly further comprises a plurality of sensors adapted to determine one or more of a pressure value or a flow rate value of one or more of: at least one of the pump-channel fluidic lines or the shared fluidic line.

6. The apparatus of claim 1, further comprising a pair of pump drive assemblies that are operable to drive the plurality of pumps.

7. The apparatus of claim 1, further comprising a sample cartridge interface adapted to be coupled to the sample cartridge, the sample cartridge interface positioned downstream of the flow cell interface.

8. The apparatus of claim 7, further comprising a sample loading manifold assembly positioned between the flow cell interface and the sample cartridge interface and comprising a body carrying a plurality of sample valves and defining a plurality of sample ports, a plurality of flow cell ports, and a plurality of pump ports, each sample port coupled to a corresponding port of the sample cartridge interface via a sample fluidic line, each flow cell port coupled to a corresponding port of the flow cell interface and associated with one of the channels of the plurality of channels of the flow cell via a flow cell fluidic line, and each pump port coupled to a corresponding pump-channel fluidic line of the plurality of pump-channel fluidic lines.

9. The apparatus of claim 8, wherein the sample valves of the sample loading manifold assembly and pumps of the pump manifold assembly are operable to individually load each channel of the plurality of channels of the flow cell with a sample of interest.

10. The apparatus of claim 8, wherein each sample valve is operable to fluidly communicate a port of the sample cartridge and a corresponding pump of the plurality of pumps of the pump manifold assembly and to fluidly communicate a pump of the plurality of pumps of the pump manifold assembly and a corresponding channel of the plurality of channels of the flow cell.

11. The apparatus of claim 1, further comprising a central valve and the auxiliary waste fluidic line is coupled to the central valve, the auxiliary waste fluidic line being positioned upstream of the flow cell interface.

12. The apparatus of claim 11, further comprising a shared line valve, a bypass valve, a plurality of dedicated reagent fluidic lines, and a shared reagent fluidic line, the shared reagent fluidic line coupling the shared line valve and the central valve and adapted to flow one or more reagents to the flow cell via the central valve, each dedicated reagent fluidic line coupling the bypass valve and the central valve and adapted to flow a reagent to the flow cell via the central valve.

13. An apparatus, comprising:
a flow cell interface adapted to be coupled to a flow cell having a plurality of channels, each channel having a front and a rear;
a pump manifold assembly carrying a plurality of pump valves and a plurality of pumps and comprising a plurality of pump-channel fluidic lines, a plurality of pump fluidic lines, and a shared fluidic line, the pump valves and the pumps are operable to individually control fluid flow through each channel of the plurality of channels of the flow cell via the corresponding pump-channel fluidic lines, each pump valve being coupled to a corresponding pump-channel fluidic line, a corresponding pump fluidic line, and the shared fluidic line and being movable between a first position fluidically coupling a corresponding channel of the plurality of channels, a corresponding pump-channel fluidic line, and a corresponding pump fluidic line and a second position fluidically coupling a corresponding pump fluidic line, the shared fluidic line, and a waste reservoir, each pump coupled to a corresponding pump fluidic line;
a sample cartridge interface comprising a sipper assembly positioned downstream of the flow cell interface, the sipper assembly to draw a sample of interest from sample wells of a sample cartridge,
wherein when the flow cell interface is coupled to the flow cell, the plurality of pumps is operable to load one or more of the channels of the plurality of channels of the flow cell with the sample of interest by flowing the sample of interest in a first direction into the one or more channels of the flow cell, and the plurality of pumps is operable to flow reagent through the one or more channels of the flow cell in a second direction, opposite the first direction.

* * * * *